United States Patent
Ayachi et al.

(10) Patent No.: US 11,773,754 B2
(45) Date of Patent: Oct. 3, 2023

(54) CRYOGENIC ENERGY SYSTEM FOR COOLING AND POWERING AN INDOOR ENVIRONMENT

(71) Applicant: Nanyang Technological University, Singapore (SG)

(72) Inventors: Mohamed Fadhel Ayachi, Singapore (SG); Lizhong Yang, Singapore (SG); Alessandro Romagnoli, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 17/784,997

(22) PCT Filed: Dec. 11, 2020

(86) PCT No.: PCT/SG2020/050741
§ 371 (c)(1),
(2) Date: Jun. 13, 2022

(87) PCT Pub. No.: WO2021/118470
PCT Pub. Date: Jun. 17, 2021

(65) Prior Publication Data
US 2023/0019959 A1  Jan. 19, 2023

(30) Foreign Application Priority Data
Dec. 13, 2019 (SG) .................. SG10201912131U

(51) Int. Cl.
*F01K 25/10* (2006.01)
*F01K 13/00* (2006.01)
(Continued)

(52) U.S. Cl.
CPC .............. *F01K 25/10* (2013.01); *F01K 13/00* (2013.01); *F24F 5/0035* (2013.01); *F25B 7/00* (2013.01);
(Continued)

(58) Field of Classification Search
CPC ........ F01K 25/10; F01K 13/00; F24F 5/0035; F24F 2005/0039; F25B 7/00; F25B 11/02;
(Continued)

(56) References Cited

U.S. PATENT DOCUMENTS 5,315,840 A * 5/1994 Viegas .................. F25D 29/001
                                                                62/7
6,983,598 B2   1/2006 Dearman
(Continued)

FOREIGN PATENT DOCUMENTS

CN    110230522 A    9/2019
GB    2508017 A      5/2014
(Continued)

OTHER PUBLICATIONS

Foreign Communication from a Related Counterpart Application, International Search Report and Written Opinion dated Mar. 30, 2021, International Application No. PCT/SG2020/050741 filed on Dec. 11, 2020.
(Continued)

*Primary Examiner* — Hoang M Nguyen

(57) ABSTRACT

A cryogenic energy system for cooling and powering an indoor environment includes a cryogenic open loop comprising a cryogen source to supply a cryogen and at least one transfer-expansion stage in fluid connection with the cryogen source, each transfer-expansion stage comprising at least one heat exchanger for heat transfer therein from a hot fluid to the cryogen and a power unit for expansion therein
(Continued)

of the cryogen that has been heated in the at least one heat exchanger to generate electricity, the at least one heat exchanger including an evaporator; and a heat supply open loop configured to provide the hot fluid for heat exchange with the cryogen in the at least one heat exchanger; the cryogenic energy system configured to perform heat removal from a first heat transfer loop of a conventional cooling system, the first heat transfer loop transferring heat obtained from air in the indoor environment.

25 Claims, 15 Drawing Sheets

(51) Int. Cl.
  *F24F 5/00*    (2006.01)
  *F25B 7/00*    (2006.01)
  *F25B 11/02*    (2006.01)
  *F25B 19/00*    (2006.01)
  *F25B 25/00*    (2006.01)

(52) U.S. Cl.
  CPC ............ *F25B 11/02* (2013.01); *F25B 19/005* (2013.01); *F25B 25/005* (2013.01); *F24F 2005/0039* (2013.01); *F25B 2339/047* (2013.01); *F25B 2400/06* (2013.01)

(58) Field of Classification Search
  CPC .................. F25B 19/005; F25B 25/005; F25B 2339/047; F25B 2400/06; F25B 25/00; Y02B 30/54
  See application file for complete search history.

(56) References Cited

U.S. PATENT DOCUMENTS

| | | |
|---|---|---|
| 7,062,912 B2 | 6/2006 | Penfornis et al. |
| 7,493,763 B2 | 2/2009 | Klochko et al. |
| 9,705,382 B2 | 7/2017 | Morgan et al. |
| 10,336,159 B2 | 7/2019 | Ayers et al. |
| 2010/0024445 A1 | 2/2010 | Cichanowicz |
| 2014/0245756 A1* | 9/2014 | Morgan ................. F25J 1/0251 62/50.1 |
| 2015/0291007 A1* | 10/2015 | Ayres .................... F25D 19/006 62/50.1 |
| 2018/0142838 A1* | 5/2018 | Riley ........................ F17C 9/04 |

FOREIGN PATENT DOCUMENTS

| | | |
|---|---|---|
| WO | 2013130557 A1 | 9/2013 |
| WO | 2021118470 A1 | 6/2021 |

OTHER PUBLICATIONS

T. Evans, "The Different Technologies for Cooling Data Centers", Schneider Electric—Data Center Science Center, White Paper 59 Rev 2, 2012.

National Enviroment Agency (NEA), Data Centre Energy Efficiency Benchmarking, Sep. 2012.

* cited by examiner 420, 451, 452, 453

CRYOGENIC ENERGY SYSTEM FOR COOLING AND POWERING AN INDOOR ENVIRONMENT

CROSS-REFERENCE TO RELATED APPLICATIONS

The present application is a filing under 35 U.S.C. 371 as the National Stage of International Application No. PCT/SG2020/050741, filed Dec. 11, 2020, entitled "CRYOGENIC ENERGY SYSTEM FOR COOLING AND POWERING AN INDOOR ENVIRONMENT," which claims priority to Singapore Application No. 10201912131U filed with the Intellectual Property Office of Singapore on Dec. 13, 2019, both of which are incorporated herein by reference in their entirety for all purposes.

FIELD

This invention relates to a cryogenic energy system for cooling and powering an indoor environment.

BACKGROUND

Various indoor environments such as data centres, refrigerated warehouses, factories, buildings and so on rely on cooling technologies including chilled-water systems, air-cooled systems, water-cooled systems, glycol-cooled systems, refrigerant-cooled systems and so on [1] to maintain their temperatures within a range that is sufficiently low for their required applications. Certain indoor environments such as data centres require to be supplied at once with cold energy as well as power. In large-scale data centres (≥200 kW), the chilled-water system is the most commonly used cooling system. It involves a vapour-compression chiller which is supplied with electricity from the utility grid or a backup power generator to provide the cooling load to the indoor environment. The Power Usage Effectiveness (PUE) is a de facto standard within the data centre industry. It measures the total energy drawn by a data centre (including for cooling, lighting, power network equipment etc.) to the energy consumed by the information technology (IT) equipment, as defined by equation (1) below.

$$PUE = \frac{\text{TOTAL DATA CENTRE ENERGY}}{\text{IT EQUIPMENT ENERGY}} \quad (1)$$

Lower PUE is desirable as this indicates that the data centre is efficient in terms of energy usage. However, some surveys reported comparable and relatively high PUE average ratings in some parts of the world, for example, 2.07 in Singapore, 2.2 in the United States and 2.02 in Europe [2].

While liquified natural gas (LNG)-based power and regasification systems appear to be energy-efficient alternatives for electricity and cold energy consumers such as those requiring cooling, refrigeration, freezing etc., use of LNG-based systems requires proximity to LNG terminals which in many cases is not possible.

It is therefore desirable to provide an energy-efficient system for cooling and powering an indoor environment that does not require use of LNG while achieving lower PUE than is currently obtainable using conventional powering and cooling systems.

Summary

The presently disclosed cryogenic energy system is a zero-emission polygeneration alternative that uses liquid air or liquid nitrogen or liquid hydrogen or any other suitable cryogen other than LNG to provide efficient "green" power and cooling solution for various indoor environments, such as data centres, warehouses, factories, buildings and so on. The system may serve as a backup power solution or be used during particular on-grid conditions (e.g. grid peak demand, high electricity pricing) to provide combined generation of cooling and power to indoor environments or other end users. When used for data centres, the system can lead to low PUE values of around 1.2 as a result of combined generation of cooling and power. The system is flexible to operate under various configurations (standalone or hybrid, full-setup nominal use or partial-setup use) and various control strategies (electrical-load-following control strategy or a thermal-load-following control strategy or other strategies) depending on occurring events and facility availability. In addition, the system also has the potential for extension and synergistic use with other energy sources, as well as for derivation to further uses such as in thermal energy storage, fire suppression, etc. The system is conceived to be applicable in retrofit mode to existing sites and/or in on-plan mode to future sites that require both power and cooling.

According to a first aspect, there is provided a cryogenic energy system for cooling and powering an indoor environment, the system comprising: a cryogenic open loop comprising a cryogen source to supply a cryogen and at least one transfer-expansion stage in fluid connection with the cryogen source, each transfer-expansion stage comprising at least one heat exchanger for heat transfer therein from a hot fluid to the cryogen and a power unit for expansion therein of the cryogen that has been heated in the at least one heat exchanger to generate electricity, the at least one heat exchanger including an evaporator; and a heat supply open loop configured to provide the hot fluid for heat exchange with the cryogen in the at least one heat exchanger; the cryogenic energy system configured to perform heat removal from a first heat transfer loop of a conventional cooling system of the indoor environment for at least partially cooling the indoor environment, the first heat transfer loop transferring heat obtained from air in the indoor environment, wherein the heat removal comprises one of: heat transfer from the first heat transfer loop to the cryogen in the evaporator, and heat transfer from the first heat transfer loop to the hot fluid in the heat supply open loop that has undergone heat transfer to the cryogen in the evaporator.

The heat supply open loop may comprise a hot fluid source to supply the hot fluid and a fluid connection with an external source providing an alternative supply of the hot fluid. The at least one heat exchanger may further include at least one superheater for heat transfer from the hot fluid in the heat supply open loop to the cryogen.

The cryogenic energy system may further comprise a cooler for effecting heat transfer from the first heat transfer loop to the hot fluid in the heat supply open loop that has undergone heat transfer to the cryogen in the evaporator.

The cryogenic energy system may further comprise a first cold recuperator for effecting heat transfer from the first heat transfer loop to the cryogen that has been expanded in a last of the at least one transfer-expansion stage.

The cryogenic energy system may further comprise a second cold recuperator for effecting heat transfer from second heat transfer loop of the conventional cooling system to the cryogen that has been expanded in a last of the at least one transfer-expansion stage, the second heat transfer loop transferring heat from a chiller of the conventional cooling system to a cooling tower.

The at least one transfer-expansion stage may comprise a plurality of transfer-expansion stages, and the plurality of transfer-expansion stages may comprise at least a first transfer-expansion stage and a second transfer-expansion stage.

The at least one heat exchanger of the first transfer-expansion stage may comprise the evaporator and a superheater.

The at least one heat exchanger of the second transfer-expansion stage may comprise at least one reheater.

The plurality of transfer-expansion stages may be configured to be operated in series.

Each of the plurality of transfer-expansion stages may be provided with a bypass configured to allow each of the plurality of transfer-expansion stages to be selectably bypassed in case it is not serviceable, thereby providing redundancy to the cryogenic energy system.

The cryogenic energy system may further comprise a preheater for effecting heat transfer from cryogen that has been expanded in a last of the at least one transfer-expansion stage to the cryogen at one of: immediately upstream of the evaporator and immediately downstream of the evaporator.

The cryogenic energy system may further comprise an indirect connection for transferring heat from the hot fluid to the cryogen in the at least one heat exchanger of the at least one transfer-expansion stage.

The indirect connection may include at least one intermediate heat transfer loop comprising a suitable fluid in a closed loop with an intermediate heat exchanger and an expansion valve, wherein the suitable fluid is passed through the intermediate heat exchanger for heat transfer from the hot fluid to the suitable fluid, wherein the suitable fluid after heat transfer from the hot fluid is expanded through the expansion valve, and wherein heat is transferred from the expanded suitable fluid to the cryogen in the at least one heat exchanger of the at least one transfer-expansion stage.

The indirect connection may include a topping cycle, the topping cycle comprising a further cryogen in a closed loop with a topping cycle heat exchanger and a topping cycle power unit, wherein the further cryogen is passed through the topping cycle heat exchanger of the intermediate heat transfer loop for heat transfer from the hot fluid to the further cryogen, wherein the further cryogen after heat transfer from the hot fluid is expanded through the topping cycle power unit, and wherein heat is transferred from the expanded further cryogen to the cryogen in the at least one heat exchanger of the at least one transfer-expansion stage.

The indirect connection may comprise one intermediate heat transfer loop and one topping cycle, wherein the suitable fluid is heated in the intermediate heat exchanger by the expanded further cryogen instead of the hot fluid.

Alternatively, the indirect connection may comprise one intermediate heat transfer loop and one topping cycle, wherein the further cryogen is heated in the topping cycle heat exchanger by the expanded suitable fluid instead of the hot fluid.

The further cryogen may comprise at least one of: argon, nitrogen and a hydrocarbon.

The cryogenic energy system may further comprise an injection of an additive fluid to the cryogen in the cryogenic loop between heating of the cryogen in the at least one heat exchanger and expansion of the cryogen in the power unit.

The hot fluid source may comprise one of: ambient air, water, and a mixture of water and glycol.

The external source providing the alternative supply of the hot fluid may comprise a fuel-based power generation process.

The cryogenic energy system may be controlled by an electrical-load-following control strategy wherein satisfying electrical energy requirements of the indoor environment is prioritised.

The cryogenic energy system may be controlled by a thermal-load-following control strategy wherein satisfying cooling requirements of the indoor environment is prioritised.

The heat supply open loop may be inactive and the heat removal may comprise heat transfer from the first heat transfer loop to the cryogen in the evaporator.

The cryogen may comprise at least one of: liquid air, liquid nitrogen and liquid hydrogen.

BRIEF DESCRIPTION OF FIGURES

In order that the invention may be fully understood and readily put into practical effect, there shall now be described by way of non-limitative example only embodiments of the present invention, the description being with reference to the accompanying illustrative drawings.

DETAILED DESCRIPTION

Figure 1:
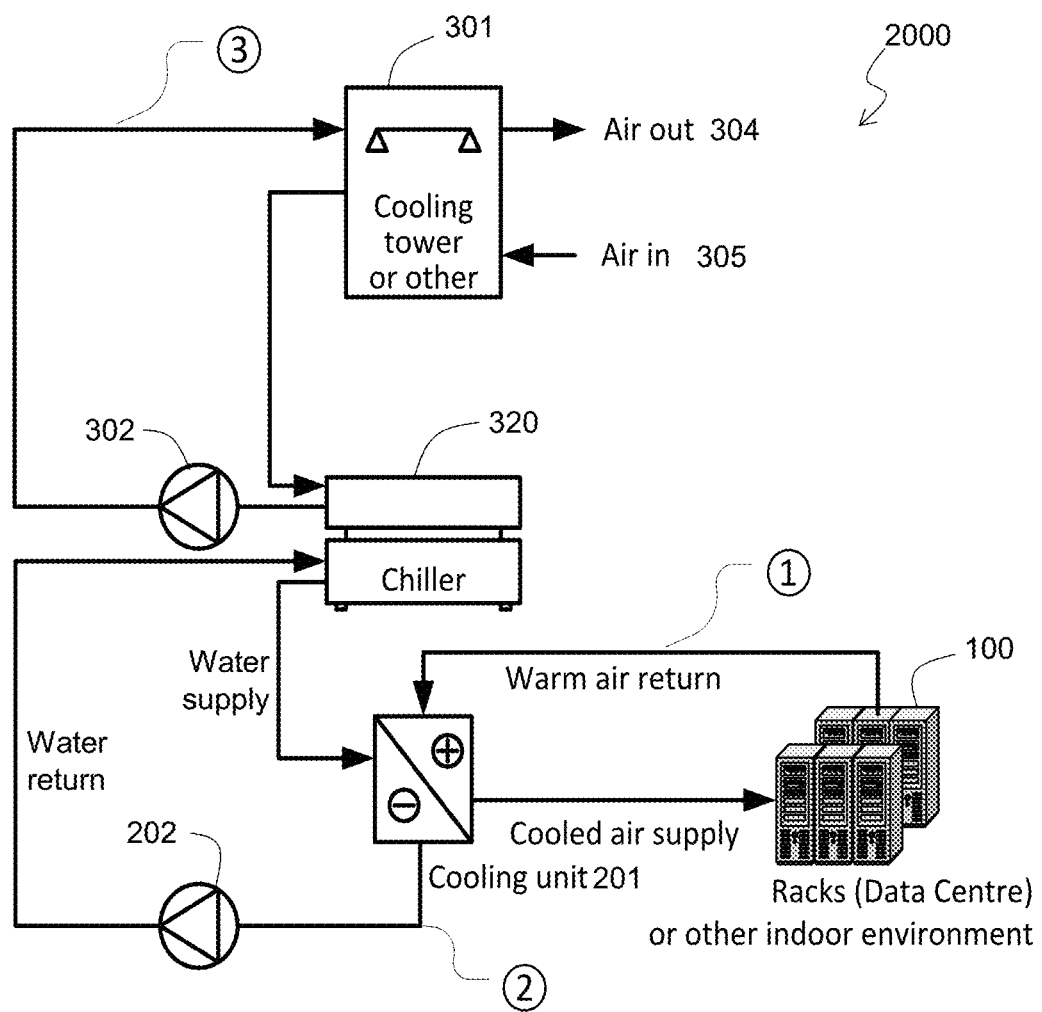
FIG. 1 is a schematic layout of an exemplary conventional cooling system.

Examples of embodiments of a cryogenic energy system 1000 (also referred to as a cryo-system 1000 or a cryo-cogenerator 1000 in this application) will be described below with reference to FIGS. 1 to 15. The same reference numerals are used across the figures to denote the same or similar parts. In the figures, solid lines refer to active components while components and connection depicted in dotted lines are either inactive or optionally activatable.

In general, the cryogenic energy system 1000 is applicable to all types or layouts of cooling/refrigeration system such chilled water systems, air-cooled systems, water-cooled systems, glycol-cooled systems, refrigerant-cooled systems and so on. In the following description of exemplary embodiments of the cryogenic system 1000, the system 1000 is schematized based on a commonly used conventional cooling system 2000 (i.e., chilled process) as shown in FIG. 1. The conventional cooling system 2000 is typically composed of a chiller 320, a cooling tower 301, a cooling unit 201 (e.g. computer room air conditioning unit or air handler (CRAC/CRAH)) for removing heat from air in the indoor environment, a heat removal loop 1 within the indoor environment 100, a first heat transfer loop 2 transferring waste heat from the cooling unit 201 to the chiller 320 (e.g. via a water return) and providing cold flux the chiller 320 to the cooling unit 201 (e.g. via a water supply), a second heat transfer loop 3 connecting the chiller 320 to the cooling tower 301 for heat rejection, and two feed pumps 202, 302 for the fluid circulation in the first and second heat transfer loops 2, 3 respectively.

In all embodiments, as shown in FIGS. 2 and 4-15, the cryogenic energy system 1000 comprises a cryogenic open loop 4 and a heat supply open loop 5 wherein at least one of the cryogenic loop 4 and the heat supply open loop 5 are in thermal connection with the conventional cooling system 2000 to provide cold flux to the indoor environment 100 that is cooled by the conventional cooling system 2000.

The cryogenic loop 4 comprises an open thermodynamic cycle that uses liquid air or liquid nitrogen or liquid hydrogen or any other suitable cryogen 401 (pure substance or a mixture of various substances) except LNG for the combined generation of cold energy and power. The cryogenic loop 4 comprises a cryogen supply 401 that may be provided in the form of one or more tanks stored onsite or supplied externally (e.g., via a supply through-pipe from a gas production plant where the cryogen is supplied in a gaseous state). When the cryogenic loop 4 is fuelled by cryogenic fluids 401 stored in tanks onsite, the cryogenic energy system 1000 is an autonomous cogenerator as it does not require direct coupling to an external regasification process. Optionally, an external cryogen supply 700 provided at a desired pressure may also be connected to the cryogenic loop 4 to provide more cryogen to the cryogenic loop 4.

The cryogenic loop 4 further comprises at least one transfer-expansion stage. FIGS. 2, 4, and 13-15 depict single stage embodiments of the cryogenic energy system 1000 that comprise one transfer-expansion stage in the cryogenic loop 4 while FIGS. 5-12 depict multistage embodiments of the cryogenic energy system 1000 that comprise two transfer-expansion stages in the cryogenic loop 4. Single stage embodiments offer simplicity to the system 1000 and occupies less space. In the multistage embodiments, two or more transfer-expansion stages can lead to a decrease in cryogen 401 consumption and offer self-redundancy to the system 1000 by providing each of the plurality of transfer-expansion stages in the multistage embodiments with a bypass configured to allow each of the plurality of transfer-expansion stages to be selectably bypassed in case it is not serviceable for any reason. For example, if one transfer-expansion stage is out of service (e.g., partial failure, maintenance issue or other situations), the system 1000 can still operate by activating the associated bypass of the non-serviceable transfer-expansion stage and involve only the available other transfer-expansion stage(s). Also, use of all multiple stages in the cryo-system 1000 under nominal operation leads to lowest cryogen consumption.

Each transfer-expansion stage comprises at least one heat exchanger that includes one evaporator 404 and may or may not include one or more superheaters 405 or one or more reheaters 409, as will be described in greater detail below. Each transfer-expansion stage also comprises one power unit 406 or 410 to generate electricity. The electricity may be used to at least partially power the indoor environment 100, and may be provided directly to the indoor environment 100 or to a grid that provides power to the indoor environment 100. The power unit 406, 410 may comprise expansion machinery such as a power turbine or positive-displacement machine or any other engine and a power generator. For two-stage embodiments of the system 1000, the turbines 406, 410 in the two transfer-expansion stages may be named according to the pressure level they each experience: turbine HP (high pressure) 406 and turbine LP (low pressure) 410 respectively.

The cryogenic loop 4 may further comprise an optional preheater 403 arranged to provide an internal heat transfer within the cryogenic loop 4. The cryogenic loop 4 may also further comprise two optional cold recuperators 421, 430 provided in parallel downstream of the last transfer-expansion stage 406 or 410 wherein the first and second cold recuperators 421, 430 respectively directly connect the output of the last transfer-expansion stage 406 or 410 to the first and second heat transfer loops 2 and 3 respectively of the conventional cooling system 2000 of FIG. 1.

The cryogenic loop 4 also comprises a pump or compressor 402 to move the cryogen 401 through the cryogenic loop 4 and piping (including valves, by-pass lines and drain lines) that place the cryogen supply 401, the preheater 403 (optional), at least one transfer-expansion stage and the cold recuperators 421, 430 (optional) in series connection in the given order.

In the cryogenic open loop 4, the cryogen 401 (at subzero temperature and liquid state in some embodiments) may be successively compressed through the feed pump or compressor 402 (at subcritical or supercritical pressure), gasified in the preheater 403, heated up by transferring cold flux to either the heat supply open loop 5 (to be described in greater detail below) or the cooling system first heat transfer loop 2 through at least one of the active heat exchanger(s) 404, 405,

409 and then expanded through the active power unit(s) 406, 410 to deliver gross power output. A fraction of this power output may be used to cover auxiliary power consumption by the system 1000 itself, such as to power the motor-pump(s) or compressor 402 and a blower/compressor 501 of the heat supply loop 5.

In the cryogenic loop 4, available energy at the exit 407 of the last turbine or power unit 406 or 410 can be recovered according to different modes. For example, the available energy can be internally transferred as a hot flux to preheat the cryogen through the preheater 403 prior to heating of the cryogen by the evaporator 404, or directly transferred as a cold flux to the cooling system first heat transfer loop 2 through a first cold energy recuperator 421 and/or as a cold flux to the cooling unit second heat transfer loop 3 through a second cold energy recuperator 430 to cover a cooling part-load and/or to fully or partially support the heat rejection process when the chiller(s) 320 is operating together with the cryo-cogenerator 1000, thus resulting in a further reduction of the cryogen consumption. The cold energy still available at the exit 408 of the preheater 403 or at the exit 407 of the last stage 406 or 410 of the cryogenic open loop 4 can also be subject to optional Cold Energy Storage (CES) or to optional external use.

Optionally, additive fluid 800, 900 such as helium, hydrogen or any other suitable additive may be injected into the cryogenic open loop 4 to be mixed with the cryogen 401 at the entrance of the turbine(s) 406, 410 respectively. This would increase the power density and thus decrease the cryogen consumption. Considering this option, the determination of the mass fraction of the additive fluid 800, 900 can be a trade-off between the total storage volume for cryogen (land space) and the operational cost.

The heat supply open loop 5 provides a hot fluid to drive the power generation process. The heat supply open loop 5 is configured to be able to use hot fluid from a hot fluid source 500 such as ambient air which is free, or to use other hot fluids instead of ambient air, such as a glycol-water mixture or other fluids such as water (e.g. from a river or lake), as the hot fluid to provide heat flux to the cryogenic loop 4 for power generation when the cryogenic energy system 1000, as shown in FIGS. 7-10.

The heat supply open loop 5 is further configured to be able to use an alternative hot or warm fluid 502 from an external process (instead of ambient air or other hot fluid sources 500) that is passed from an active line 6 from the external process to the heat supply open loop 5 as the hot fluid to provide heat flux at high temperature to the cryogenic open loop 4, thus increasing the turbine inlet temperature in each expansion stage of the cryogenic loop 4.

Figure 13:
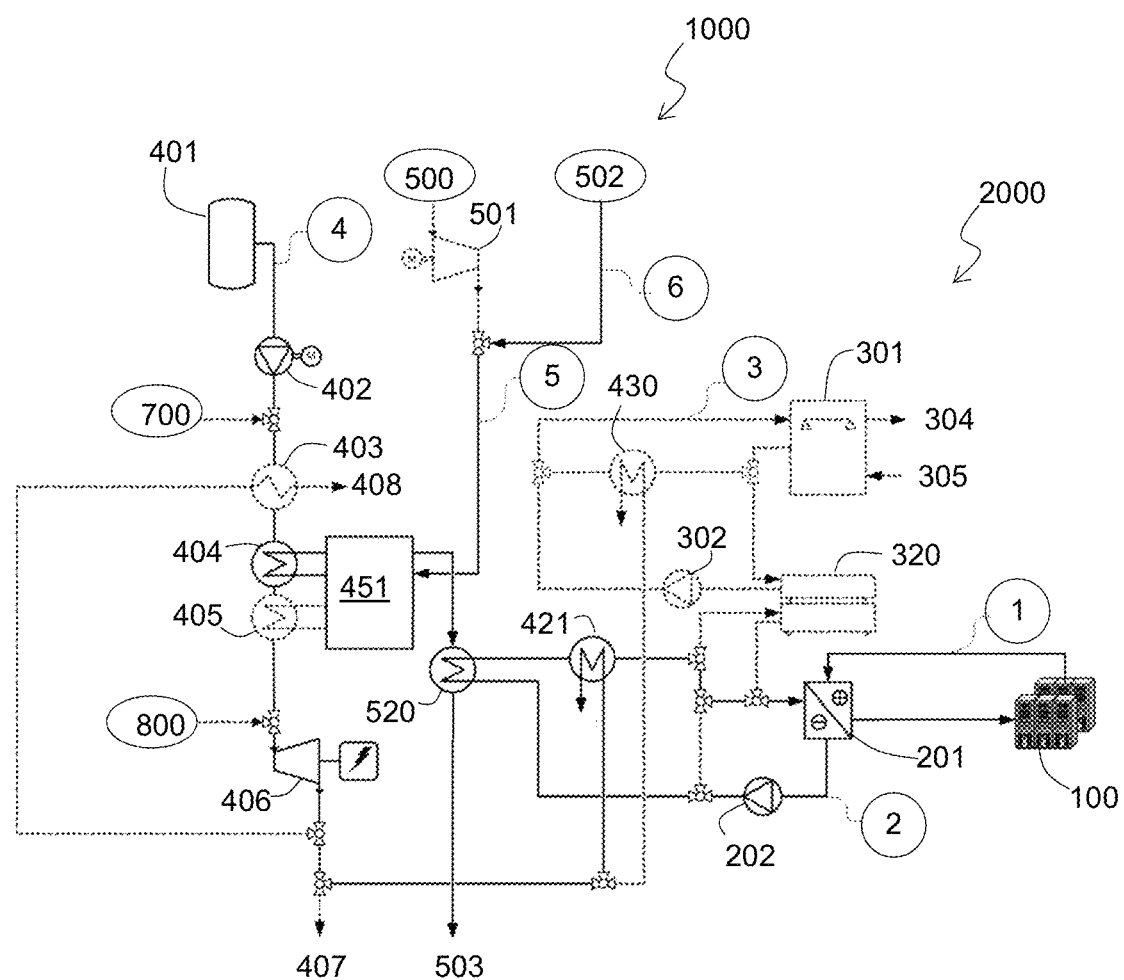
FIG. 13 is the system of FIG. 2 configured as a hybrid cryogenic energy system where a chiller of the conventional cooling system is bypassed.
Figure 14:
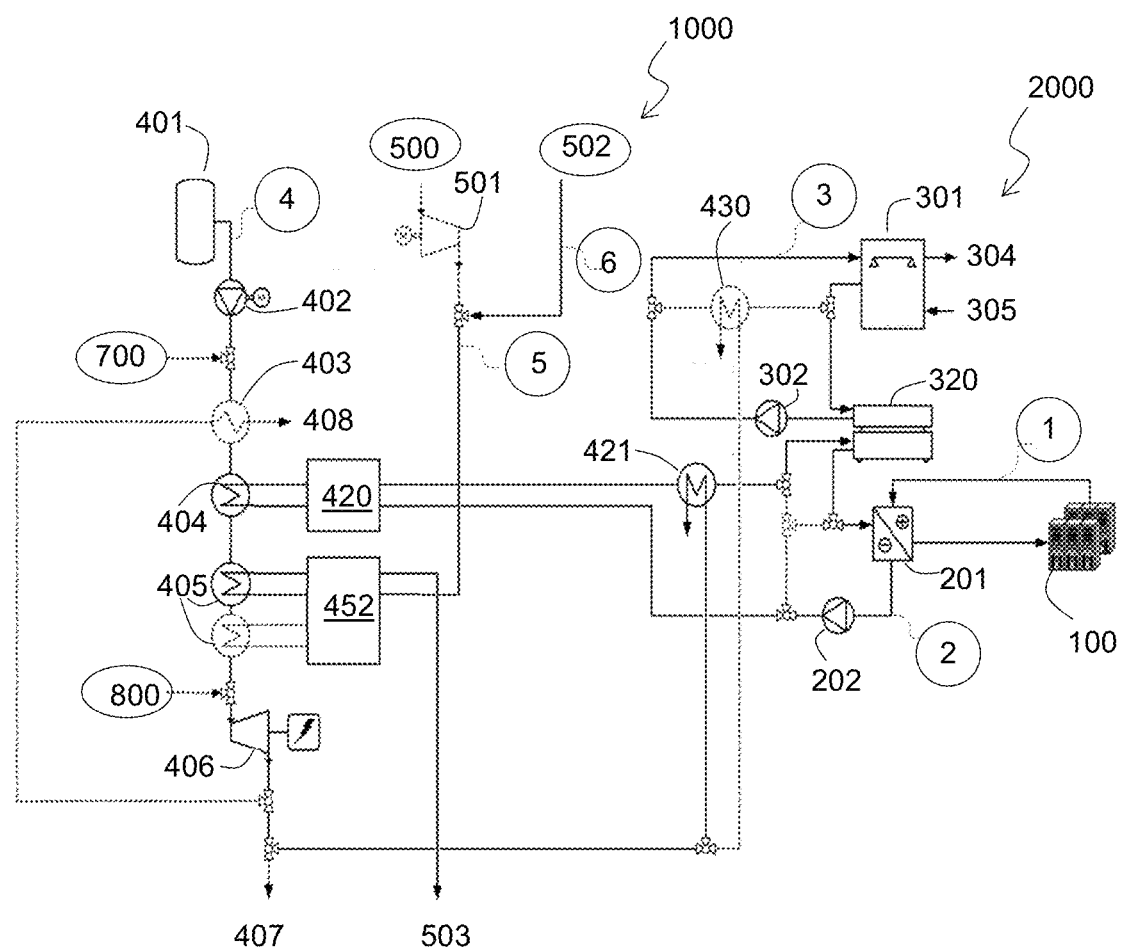
FIG. 14 is the system of FIG. 4 configured as a hybrid cryogenic energy system that uses both the chiller of the conventional cooling system and cold energy recuperation from the cryogenic loop for cooling the indoor environment.
Figure 15:
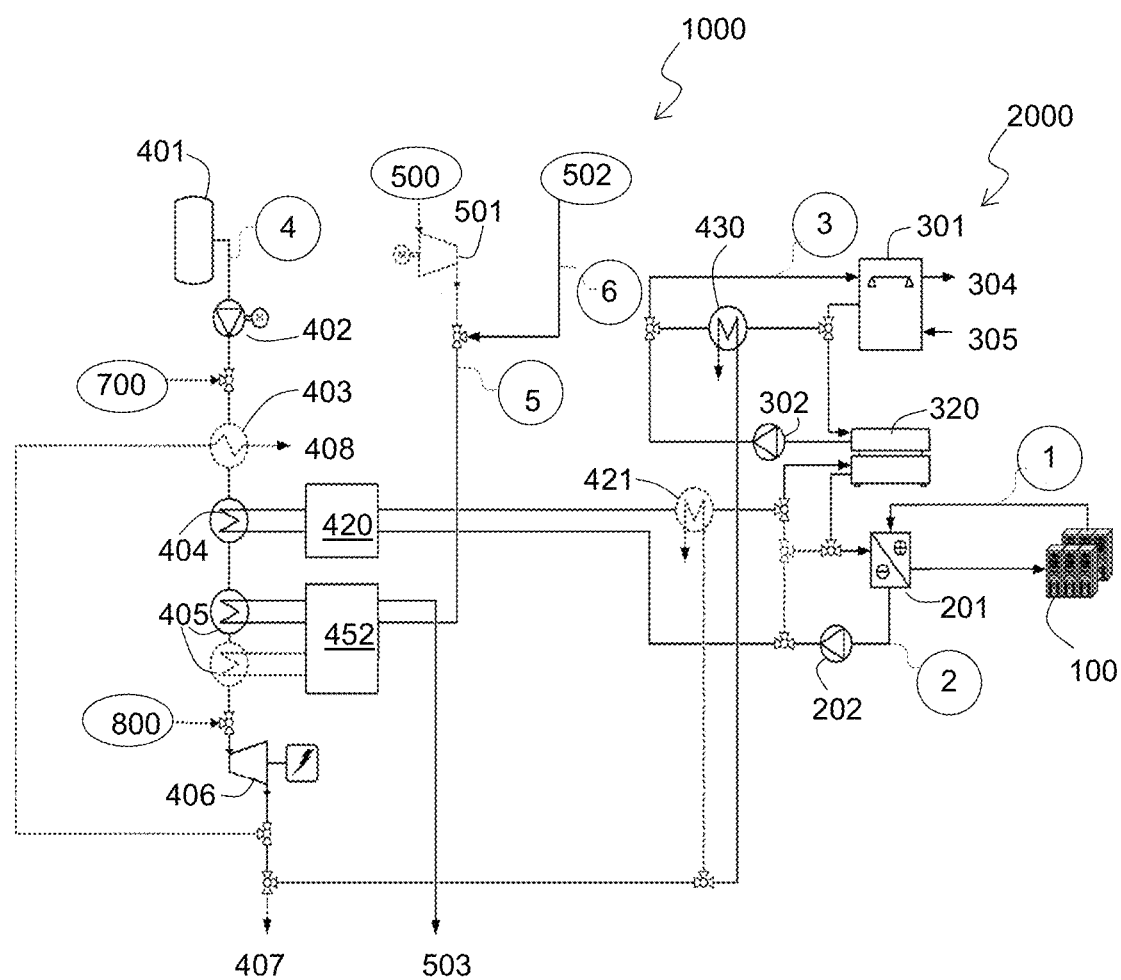
FIG. 15 is the system of FIG. 4 configured as a hybrid cryogenic energy system that uses both the chiller of the conventional cooling system and cold energy recuperation from the cryogenic loop for the heat rejection process of the conventional cooling system.

Use of alternative hot or warm fluid from an external process 502 may be considered a hybrid operation of the cryogenic energy system 1000 as shown in FIGS. 13-15 where the cryo-cogenerator 1000 is coupled with a fuel-based power generation process (e.g. internal combustion engine, fuel cell) or other process via the heat supply open loop 5. This enables reduction of the specific consumption of cryogen 401 compared to when the cryogenic energy system 1000 is operated as a standalone cryo-cogenerator 1000 using ambient air 500 or another hot fluid source 500 to provide heat flux. The hybrid cryo-cogenerator 1000 offers higher redundancy and higher functionality levels compared to the standalone cryo-cogenerator 1000 due to the multi-energy vector. Accordingly, the alternative hot/warm fluid 502 may comprise exhaust gases, vapour, fuel, refrigerant such as flue gases in the case of hybrid operation with a combustion engine process or exhaust gases and vapour/stack coolant outlet/surplus fuel return in the case of hybrid operation with a fuel cell process. For certain hot fluids such as stack coolant or surplus fuel from a fuel cell process, the fluid is preferably not discharged at the exit of the heat supply open loop but subject to recirculation.

Under hybrid operation with a combustion engine process supplying the hot fluid 502 in the heat supply open loop 5, a part of the cold energy delivered by the cryogenic open loop 4 can be used for Cryogenic Carbon Capture and Storage (CCCS) from the flue gases. Under hybrid operation with a fuel cell process supplying the hot fluid 502 in the heat supply open loop 5, the use of liquid hydrogen 401 as a cryogen is advantageous as the cryogenic open loop 4 can supply the fuel cell process with the exhausting hydrogen gas. A part of the cold energy delivered by the cryogenic open loop 4 can be used for the stack cooling process.

The heat supply open loop 5 further comprises a blower or compressor or pump 501 for air flow (depending on the pressure losses within the loop 5) or liquid flow through the heat supply open loop 5 as well as appropriate pipes and valves to establish fluid connection between components in the heat supply open loop 5.

Figure 2:
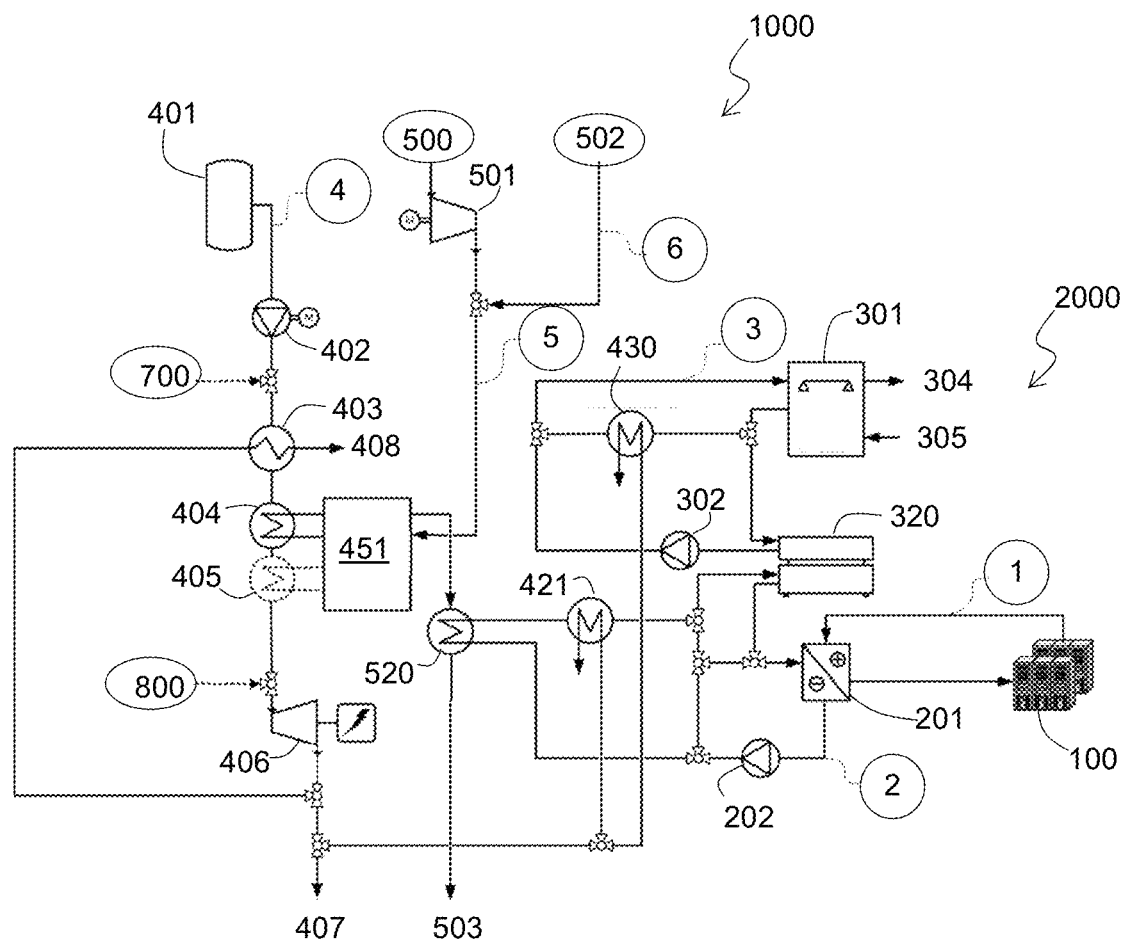
FIG. 2 is a schematic layout of an exemplary single stage cryogenic energy system where a heat supply open loop of the system is a sole driver of power generation.
Figure 3A:
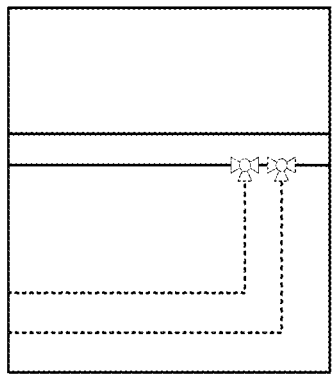
FIG. 3A-E shows exemplary embodiments of direct and indirect connections between a hot fluid source and a heat exchanger of a cryogenic open loop of the cryogenic energy system, wherein the hot fluid source may comprise hot fluid in the heat supply open loop or hot fluid in a first heat transfer loop of a conventional cooling system of an indoor environment.

The heat supply open loop 5 is thermally connected to the cryogenic loop 4 (via direct or indirect connections 451, 452, 453) to effect heat exchange between the hot fluid 500 or 502 in the heat supply open loop 5 with the cryogen 401 in the cryogenic loop 4.

Where the connection 451, 452, 453 is direct, as shown in FIG. 3(a), the hot fluid 500 or 502 is directly connected to a heat exchanger of at least one of the evaporator 404 (e.g. FIG. 2), the superheater 405 (e.g. FIGS. 2 and 4-6) or the reheater 409 (e.g. FIGS. 5 and 6) of the cryogenic loop 4, where such is provided, as will be described in greater detail below.

Figure 3B:
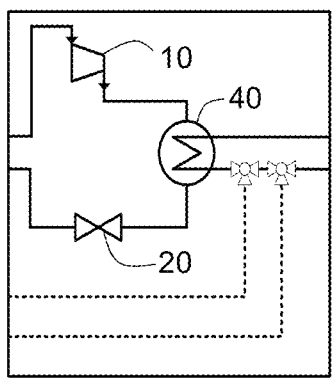
Figure 3C:
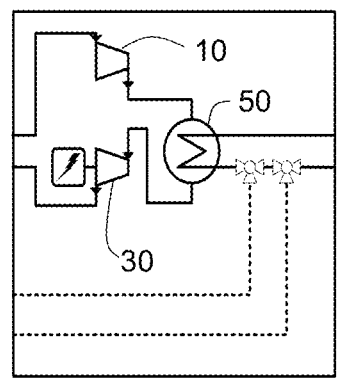
Figure 3D:
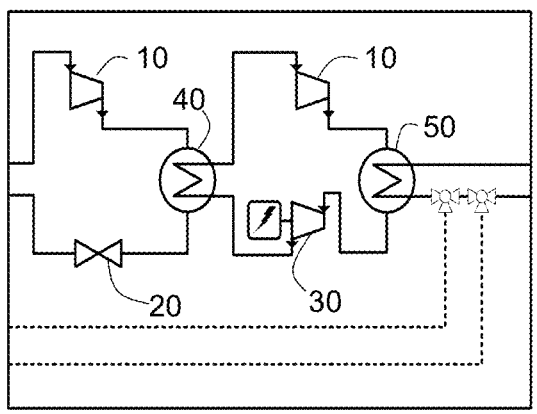
Figure 3E:
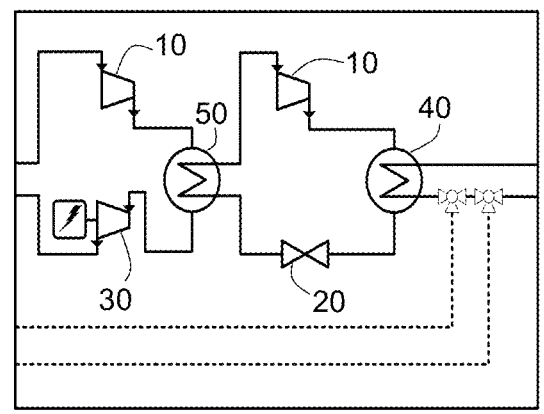

Alternatively, where the connection 451, 452, 453 is indirect, exemplary embodiments of the indirect connection as shown in FIG. 3(b) and FIG. 3(e) may comprise one or more intermediate heat transfer loops in which $CO_2$, glycol-water mixture or other suitable fluid is passed through a pump or compressor 10 to an intermediate heat exchanger 40 of the intermediate heat transfer loop for heat exchange with (i.e. heat transfer from) the hot fluid 500 or 502. In the embodiment shown in FIG. 3(b), the fluid in the intermediate heat transfer loop is then passed through an expansion valve 20 to the heat exchanger of the evaporator 404, superheater 405 or reheater 409 as the case may be for heat exchange with (i.e. transfer to) the cryogen 401 in the cryogenic loop 4. This can be adopted to limit the freezing of the air moisture content in the heat exchanger(s) 404, 405, 409, especially in humid climates.

Other exemplary embodiments as shown in FIGS. 3(c) to 3(e) of the indirect connection 451, 452, 453 include a topping thermodynamic cycle for a higher performance of the system 1000 with or without an intermediate heat transfer loop. The topping cycle is a closed cycle using a further cryogen for power generation and contains a pump (or a compressor) 10, a topping cycle heat exchanger 50 and a topping cycle power unit 30 that may comprise expansion machinery (such as a power turbine) and a power generator. The further cryogen is passed through a pump or compressor 10 to the topping cycle heat exchanger 50 for heat exchange from the hot fluid 500 or 502 to the further cryogen. The heated further cryogen is then expanded through the power unit 30 and passed to the heat exchanger of the evaporator 404, superheater 405 or reheater 409 as the case may be for heat exchange with (i.e. transfer to) the cryogen 401 in the cryogenic loop 4. Where a topping cycle is included, the cryo-system 1000 is a cryogenic cascade where the cryogenic loop 4 comprises a bottoming open cycle in addition to the topping cycle provided in the indirect connection between the heat supply open loop 5 and the cryogenic loop 4. Exemplary embodiments of the cryogenic cascade include a nitrogen-based bottoming open cycle+argon-based topping closed cycle; a hydrogen-based bottoming open cycle+nitrogen-based topping closed cycle; a hydrogen-based bottoming open cycle+argon-based topping closed cycle; a nitrogen-based bottoming open cycle+hydrocarbon-based topping closed cycle; and a hydrogen-based bottoming open cycle+hydrocarbon-based topping closed cycle. Where a topping cycle is included together with a preheater 403, the preheater 403 may alternatively be located immediately downstream of the evaporator 404 instead of upstream of the evaporator as shown in FIGS. 2 and 4-15, depending on the properties of the further cryogen used in the topping cycle and the operating conditions of the topping cycle.

Notably, all embodiments of the cryogenic energy system 1000 comprise an evaporator 404 for heat transfer to the cryogen 401.

In configurations where the system 1000 depends solely on hot fluid 500 or 502 provided by the heat supply open loop 5 for heat flux such that the heat supply open loop 5 is the only driver for power generation (as shown in FIGS. 2, 5, 8, 10 and 13), heat exchange between the hot fluid 500 or 502 and the cryogen 401 is configured to take place at the evaporator 404 via a direct or indirect connection 451 as described above. In such configurations, the system 1000 may optionally further comprise a superheater 405 in addition to the evaporator 404 for further heat exchange between the hot fluid 500 or 502 and the cryogen 401 for better performance, wherein the evaporator 404 and superheater 405 are provided in a serial-parallel cascade configuration in the direct or indirect connection 451.

In configurations of the system 1000 where the heat supply open loop 5 is not the only supplier of heat flux as the driver for power generation (as will be described in greater detail below), the system 1000 includes at least one superheater 405 (as shown in FIGS. 4, 6, 7, 9, 11, 12, 14 and 15) in direct or indirect connection 452 (as described above) with the heat supply open loop 5 for heat exchange between the hot fluid 500 or 502 and the cryogen 401. Multiple superheaters 405 may be provided in the connection 452 in serial-parallel cascade configuration for better performance.

Multistage embodiments of the cryogenic system 1000 (as shown in FIGS. 5-12) include at least one reheater 409 in direct or indirect connection 453 (as described above) with the heat supply open loop 5 for further heat exchange between the hot fluid 500 or 502 and the cryogen 401. Multiple reheaters 409 may be provided in the connection 453 in serial-parallel cascade configuration for better performance.

At the exit 503 of the heat supply open loop 5, the excess cold energy may be released to surroundings or alternatively delivered to other locations for cooling purposes. In cases where the hot fluid 500 comprises glycol-water (or liquid use in general), the exhausted cold liquid can be collected and warmed back by free convection for future reuse (recycling). This option would require an additional space for liquid storage and recovery, but has the advantage of reducing the auxiliary power consumption (and thus the cryogen consumption) since in this case a liquid pump is used instead of an air blower/compressor.

As mentioned above, the heat supply open loop 5 can be designed to serve as the only driver of the gasification and power generation processes or another heat source can be provided in addition to the heat supply open loop 5 to drive the gasification and power generation processes, depending on the application.

In cases where there is no cooling requirement or a non-important thermal load, the heat supply open loop 5 can be used as the only driver of the gasification and power generation processes. In such cases, as shown in FIGS. 2, 5, 8, 10 and 13, the heat supply open loop 5 also serves as an intermediate heat transfer loop between the cryogenic loop 4 and the first heat transfer loop 2 transferring waste heat from the cooling unit 202 of the conventional cooling system 2000. In such cases, fluid in the heat transfer open loop 5 that has gone through heat exchange with the cryogen 401 receives the waste heat from the cooling unit 201 via a heat exchanger or cooler 520 that connects the first heat transfer loop 2 with the heat supply open loop 5 downstream of the heat exchanger(s) 404, 405, 409 in the cryogenic loop 4. In other words, when the heat supply open loop 5 is the only driver used for power generation, the received cold flux or a part of the received cold flux from the cryogenic loop 4 is retransferred from the heat transfer open loop 5 to the first heat transfer loop 2 of the conventional cooling system 2000 through the cooler 520.

In cases involving an important thermal load (e.g. removing waste heat from server racks in a data centre), removed heat from the indoor environment 100 can be used as an additional or alternative source of heat to drive power generation in the cryogenic loop 4, as shown in FIGS. 4, 7, 9, 11, 12, 14 and 15. For example, the removed heat from the second heat transfer loop 2 of the conventional cooling system 2000 and the outside ambient air 500 may together serve as dual hot sources for the cryo-cogenerator 1000. In such cases, the heat supply open loop 5 is connected only to the cryogenic loop 4 and has no connection with any heat transfer loops 1, 2 or 3 of the conventional cooling system 2000. In such cases, the heat transfer loop 2 of the cooling unit 201 is thermally connected to the gasification segment of the cryogenic loop 4 at the evaporator 404 via a direct or indirect connection 420. The direct or indirect connection 420 may be the same as any of the direct or indirect connections 451, 452, 453 described above with reference to FIGS. 3(*a*) to 3(*e*).

Figure 11:
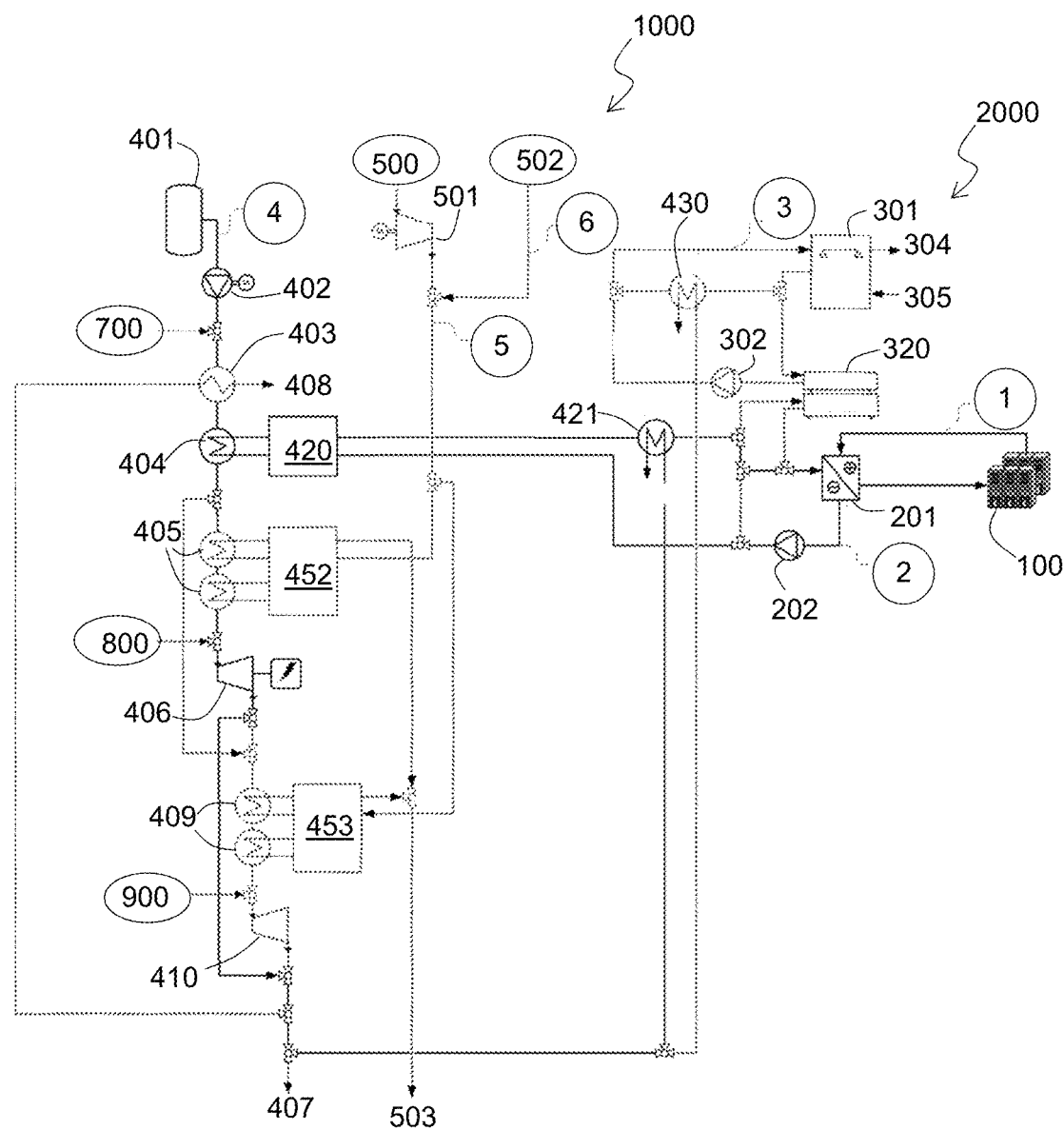
FIG. 11 is the system of FIG. 6 configured as a standalone cryogenic energy system 1000 operated under thermal-load-following control strategy when the heat supply open loop is inactive and a high pressure transfer-expansion stage is used.
Figure 12:
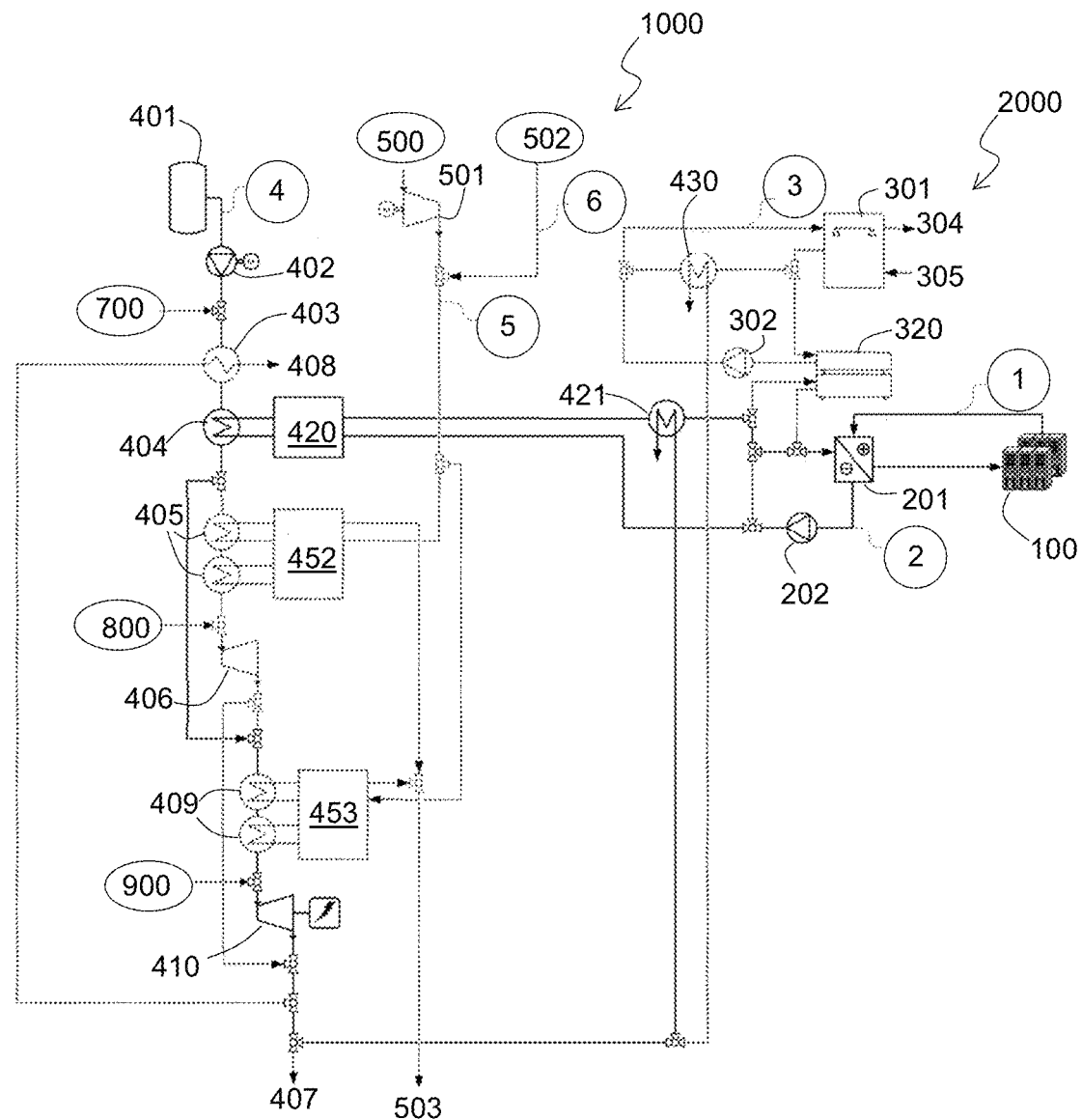
FIG. 12 is the system of FIG. 6 configured as a standalone cryogenic energy system operated under thermal-load-following control strategy when the heat supply open loop is inactive and a low pressure transfer-expansion stage is used.

For certain applications where the cold energy requirement of the indoor environment 100 is much higher than the electricity requirement (e.g. warehouses, district cooling, etc.), the heat supply open loop 5 does not have to be implemented (as can be seen in FIGS. 11 and 12) as the removed heat from the indoor environment 100 is sufficient to drive the power generation processes.

By providing the cryogenic energy system 1000 with a heat supply open loop 5, the cryogenic energy system may be operated under either an electrical-load-following control strategy or a thermal-load-following strategy. Electrical-load-following means that the cryogenic energy system 1000 will have to first satisfy the energy requirement of the indoor environment 100 in terms of electricity. Thermal-load-following means that the cryogenic energy system 1000 will have to first satisfy the energy requirement of the indoor environment 100 in terms of cold energy.

Electrical-load-following is the convenient control strategy to generate backup power since, during a power outage, the cryo-cogenerator 1000 must provide a net power output fully satisfying the electricity requirement of the indoor environment 100 (e.g. IT load in a data centre). Here, the heat supply open loop 5 is able to assure high air flow rates from the outside to fulfil that requirement but this could then result in an excess of cold energy being produced and relatively high cryogen consumption.

Thermal-load-following control strategy would not lead to an excess of cold energy production and to relatively high cryogen consumption. It is more adapted to on-grid use depending on the interest (e.g. electrical load supplied by the utility grid and the cryo-cogenerator 1000 jointly) or to generate decentralized power or backup power for particular end-users 100 where the electricity requirement is much lower than the cold energy requirement (e.g. decentralized power for tropical islands, backup power for warehouses or shopping malls or others). It is worth noting that, under-thermal-load following control strategy, it is possible to allocate a share of the produced power to drive the main cooling facility (e.g. chiller(s)) and provide a cooling part-load, which results in a reduction of the cryogen consumption.

In the hybrid configuration, the cryo-cogenerator 1000 can be used as a backup power generator when operated under thermal-load-following control strategy or other particular control strategies. This can be achieved since the electrical load is supported by both processes the cryo-cogenerator 1000 and the external fuel-based power generation process from which the hot fluid 502 in the heat supply open loop 5 is supplied. For high source temperatures, the operating conditions and accordingly the turbine(s) 406, 410 inlet temperature(s) can be varied according to the needs (e.g. operational cost, emission level limit, etc.) of the indoor environment 100. From certain high turbine inlet temperatures, the cold energy recuperation at the exit 407 of the last cryogenic turbine 406 or 410 is no longer applicable and the resulting regime of the cryo-system 1000 cannot fully support the required thermal load. In this case, the conventional chiller(s) is/are required to add cold energy and is/are supplied by the hybrid cryo-cogenerator 1000.

Where an additive fluid 800, 900 is injected into the cryogenic open loop 4 as discussed above, from a certain mass fraction of the additive fluid 800, 900, electrical-load-following may lead to a lack of cooling; in this case, thermal-load-following becomes the convenient control strategy to generate backup power.

In all configurations, within the cooling system first heat transfer loop 2, the main cooling facility (e.g. chiller) 320 may be by-passed if the cryo-cogenerator 1000 is fully supporting the cooling load (as shown in FIGS. 7-13).

Exemplary embodiments of exemplary implementations of the cryogenic energy system 1000 will now be described with reference to FIGS. 7-15.

Figure 6:
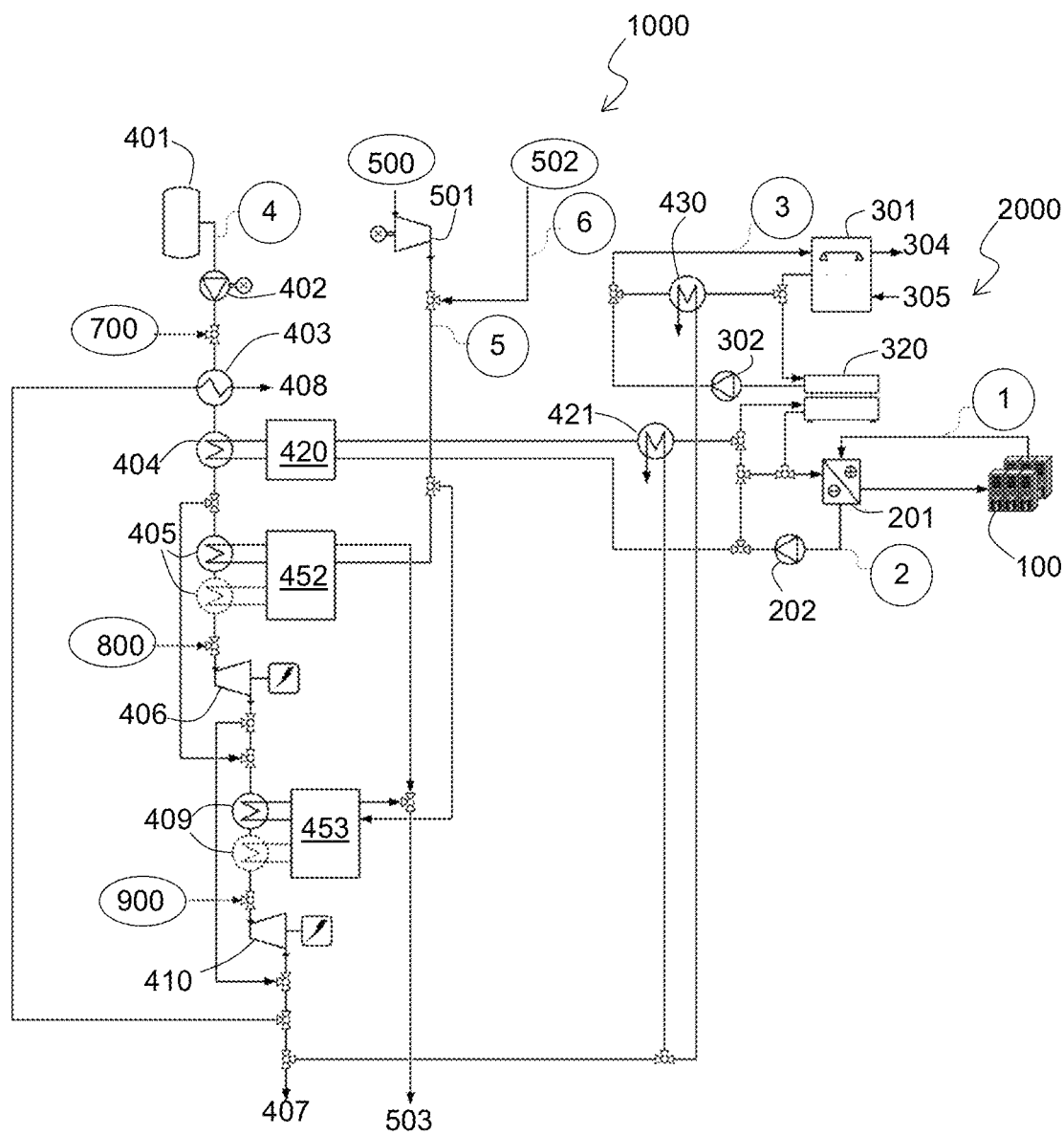
FIG. 6 is a schematic layout of an exemplary multistage cryogenic energy system where removed heat from an indoor environment may additionally or alternatively drive power generation.
Figure 7:
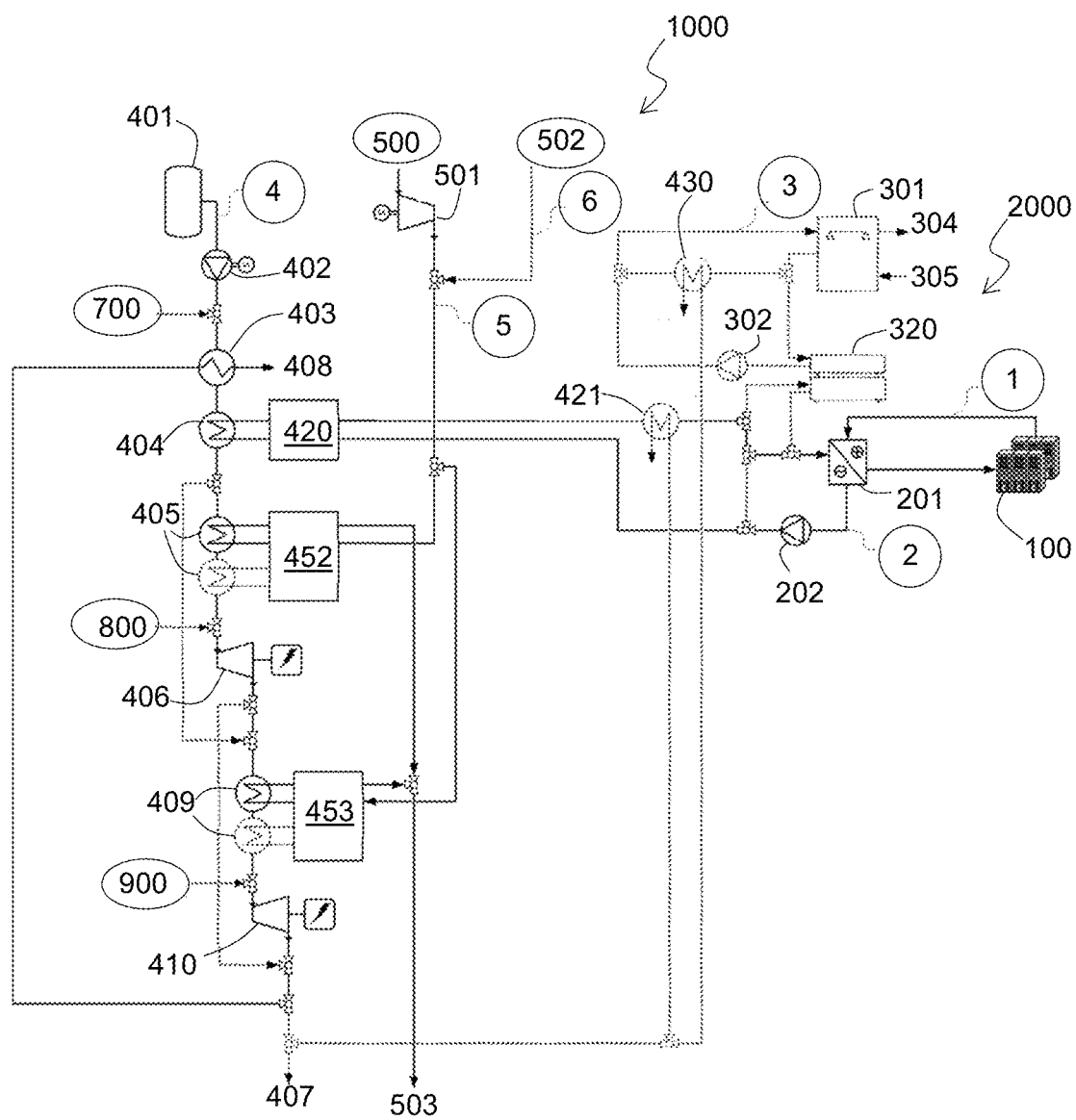
FIG. 7 is the system of FIG. 6 configured as a standalone cryogenic energy system operated under electrical-load-following control strategy, with the full-setup in nominal use.

FIG. 7 depicts the exemplary dual stage system 1000 of FIG. 6 configured as a standalone cryogenic energy system 1000 operated under electrical-load-following control strategy, with the full-setup in nominal use where multiple transfer-expansion stages are connected in series and in use. Electrical-load-following is a convenient control strategy to generate backup power since, during a power outage, the cryo-cogenerator 1000 must provide a net power output fully satisfying the electricity requirement of the indoor environment 100 (e.g. IT load in a data centre). During nominal operation (lowest cryogen consumption), both of the transfer-expansion stages are functioning. Therefore, the bypasses of both stages are inactive. The cryogen 401 is consecutively pressurized in the motor-pump 402, gasified in the preheater 403, heated up in the evaporator 404 and the superheater(s) 405, expanded in the turbine HP 406, reheated in the reheater(s) 409, expanded again in the turbine LP 410, cooled down further in the preheater 403, and then exhausted 408. The generators coupled to the turbines 406, 410 deliver power outputs that fully satisfy the electricity requirement of the indoor environment 100. This can be assured since the heat supply open loop 5 is able to add the necessary heat flux for backup power generation from ambient air 500 or another hot fluid source 500. As the cryogen consumption is controlled following the electrical load requirement, cold energy that still available at the exit 408 of the preheater 403 is not needed for internal use and can be subject to loss or to optional storage or to optional external use. The cold recuperators 421, 430 connected to the conventional cooling system 2000 are then inactive. In the cooling system first heat transfer loop 2, all the required cold energy for the cooling load is received from the cryogenic open loop 4 via the evaporator 404 while the chiller 320 and its related heat rejection process (i.e. cooling system second heat transfer loop 3) are inactive.

Figure 5:
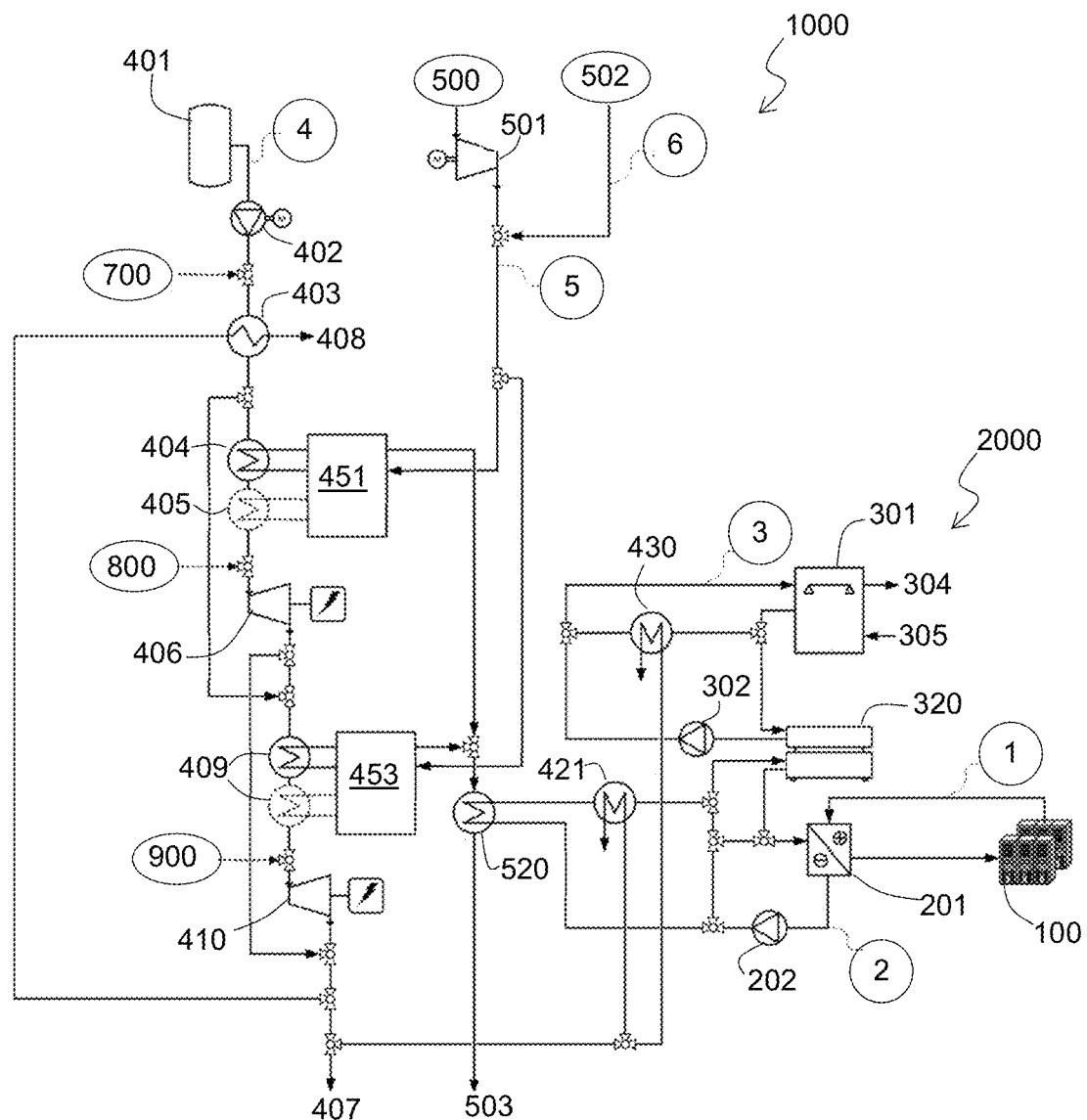
FIG. 5 is a schematic layout of an exemplary multistage cryogenic energy system where a heat supply open loop of the system is a sole driver of power generation.
Figure 8:
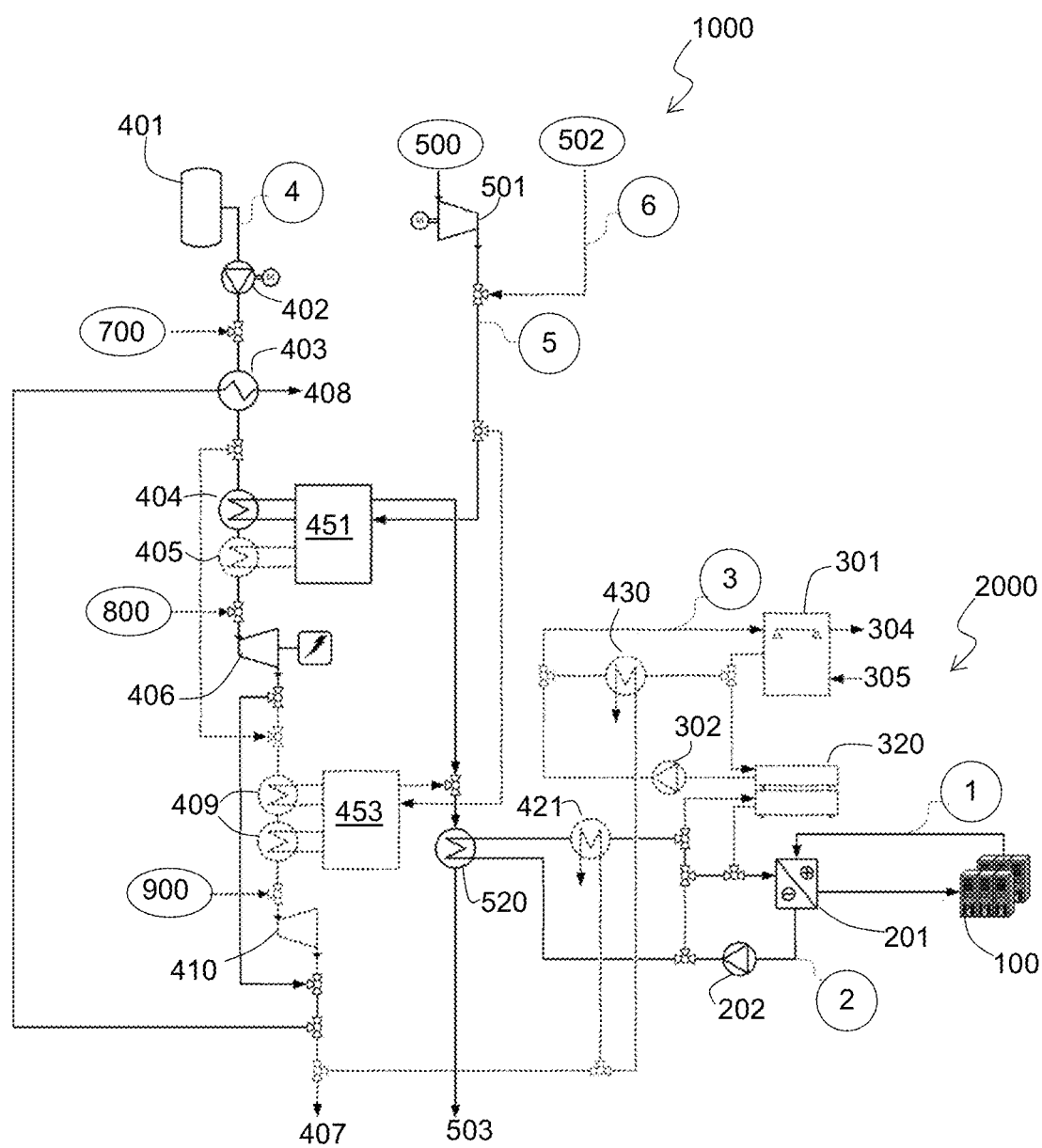
FIG. 8 is the system FIG. 5 configured as a standalone cryogenic energy system operated under electrical-load-following control strategy, under partial-setup use where a low pressure transfer-expansion stage is out of service.

FIG. 8 depicts the exemplary dual stage system 1000 of FIG. 5 configured as a standalone cryogenic energy system 1000 operated under electrical-load-following control strategy, under partial-setup use where the low pressure transfer-expansion stage (stage LP) 409, 410 is out of service. Electrical-load-following is a convenient control strategy to generate backup power since, during a power outage, the cryo-cogenerator 1000 must provide a net power output fully satisfying the electricity requirement of the indoor environment 100 (e.g. IT load in a data centre). If stage LP is out of service (e.g. partial failure, maintenance issue or other situations), only the high pressure transfer-expansions stage (stage HP) 404, 405, 406 will be functioning. Therefore, the bypass of stage LP is activated to skip the reheater 409 and turbine LP 410. The cryogen 401 is consecutively pressurized in the motor-pump 402, gasified in the preheater 403, heated up in the evaporator 404 and the optional superheater 405, expanded in the turbine HP 406, cooled down further in the preheater 403, and then exhausted 408. The generator coupled to turbine HP 406 delivers power output that fully satisfies the electricity requirement of the indoor environment 100. This can be assured since the heat supply open loop 5 is able to add the necessary heat flux for backup power generation from ambient air 500 or another hot fluid source 500. As the cryogen consumption is controlled following the electrical load requirement, cold energy that still available at the exit 408 of the preheater 403 is not needed for internal use and can be subject to loss or to optional storage or to optional external use. The cold recuperators 421, 430 connected to the conventional cooling system 2000 are then inactive. In the cooling system first heat transfer loop 2, all the required cold energy for the cooling load is received from the heat supply open loop 5 via the cooler 520 while the chiller 320 and its related heat rejection process (i.e. cooling system second heat transfer loop 3) are inactive.

Figure 9:
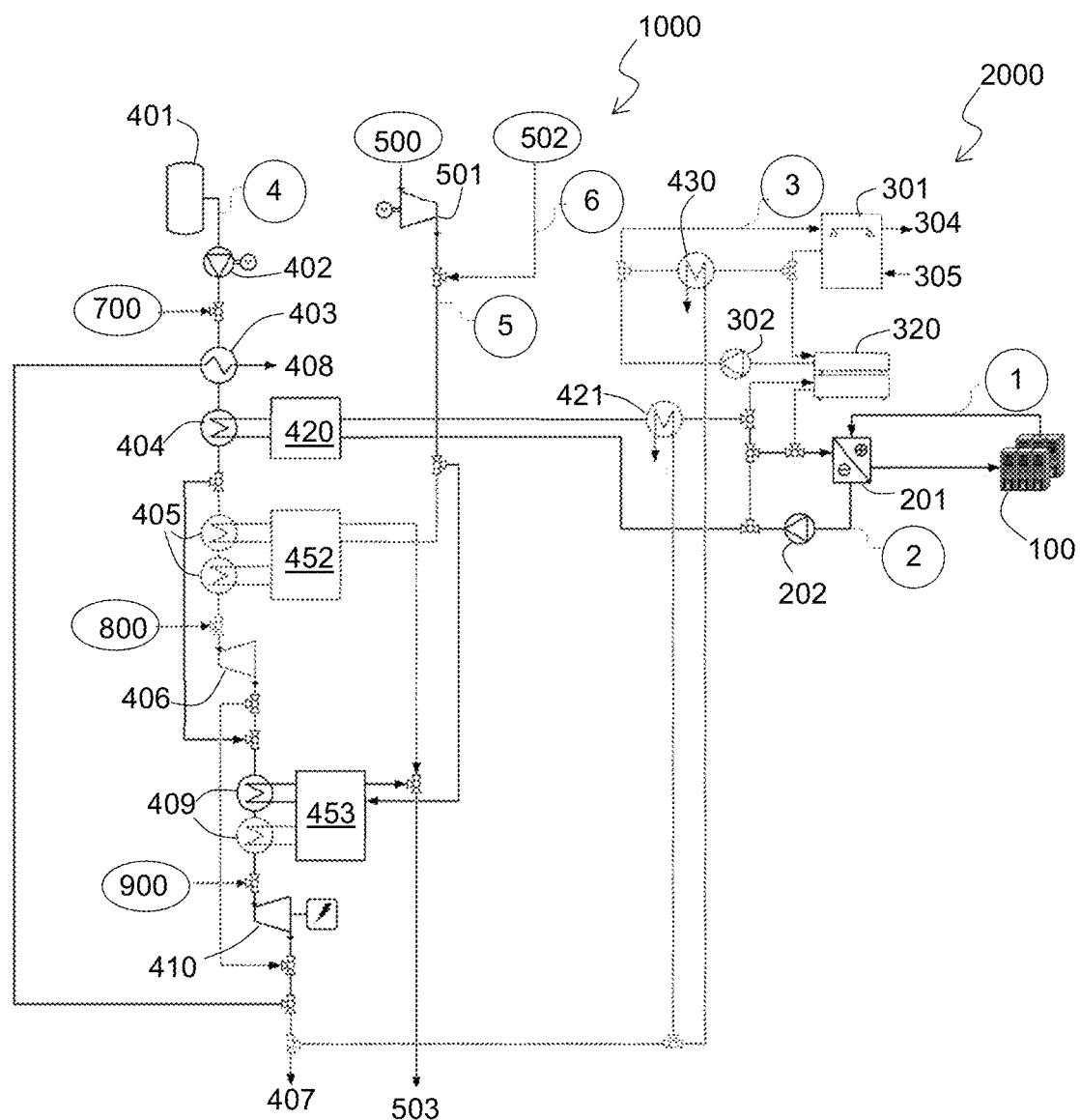
FIG. 9 is the system of FIG. 6 configured as a standalone cryogenic energy system operated under electrical-load-following control strategy, under partial-setup use where a high pressure transfer-expansion stage is out of service.

FIG. 9 depicts the exemplary dual stage system 1000 of FIG. 6 configured as a standalone cryogenic energy system 1000 operated under electrical-load-following control strategy, under partial-setup use where stage HP 404, 405, 406 is out of service. Electrical-load-following is a convenient control strategy to generate backup power since, during a power outage, the cryo-cogenerator 1000 must provide a net power output fully satisfying the electricity requirement of the indoor environment 100 (e.g. IT load in a data centre). If stage HP 404, 405, 406 is out of service (e.g. partial failure, maintenance issue or other situations), only stage LP 409, 410 will be functioning. Therefore, the bypass of stage HP 404, 405, 406 is activated to skip the superheater 405 and turbine HP 406. The cryogen 401 is consecutively pressurized in the motor-pump 402, gasified in the preheater 403, heated up in the evaporator 405 and the reheater(s) 409, expanded in the turbine LP 410, cooled down further in the preheater 403, and then exhausted 408. The generator coupled to turbine LP 410 delivers power output that fully satisfies the electricity requirement of the indoor environment 100. This can be assured since the heat supply open loop 5 is able to add the necessary heat flux for backup power generation from ambient air 500 or another hot fluid source 500. As the cryogen consumption is controlled following the electrical load requirement, the cold energy still available at the exit 408 of the preheater 403 is not needed for internal use and can be subject to loss or to optional storage or to optional external use. The cold recuperators 421, 430 connected to the conventional cooling system 2000 are then inactive. In the cooling system first heat transfer loop 2, all the required cold energy for the cooling load is received from the cryogenic open loop 4 via the evaporator 404; the chiller and its related heat rejection process (i.e. cooling system second heat transfer loop 3) are inactive.

Figure 10:
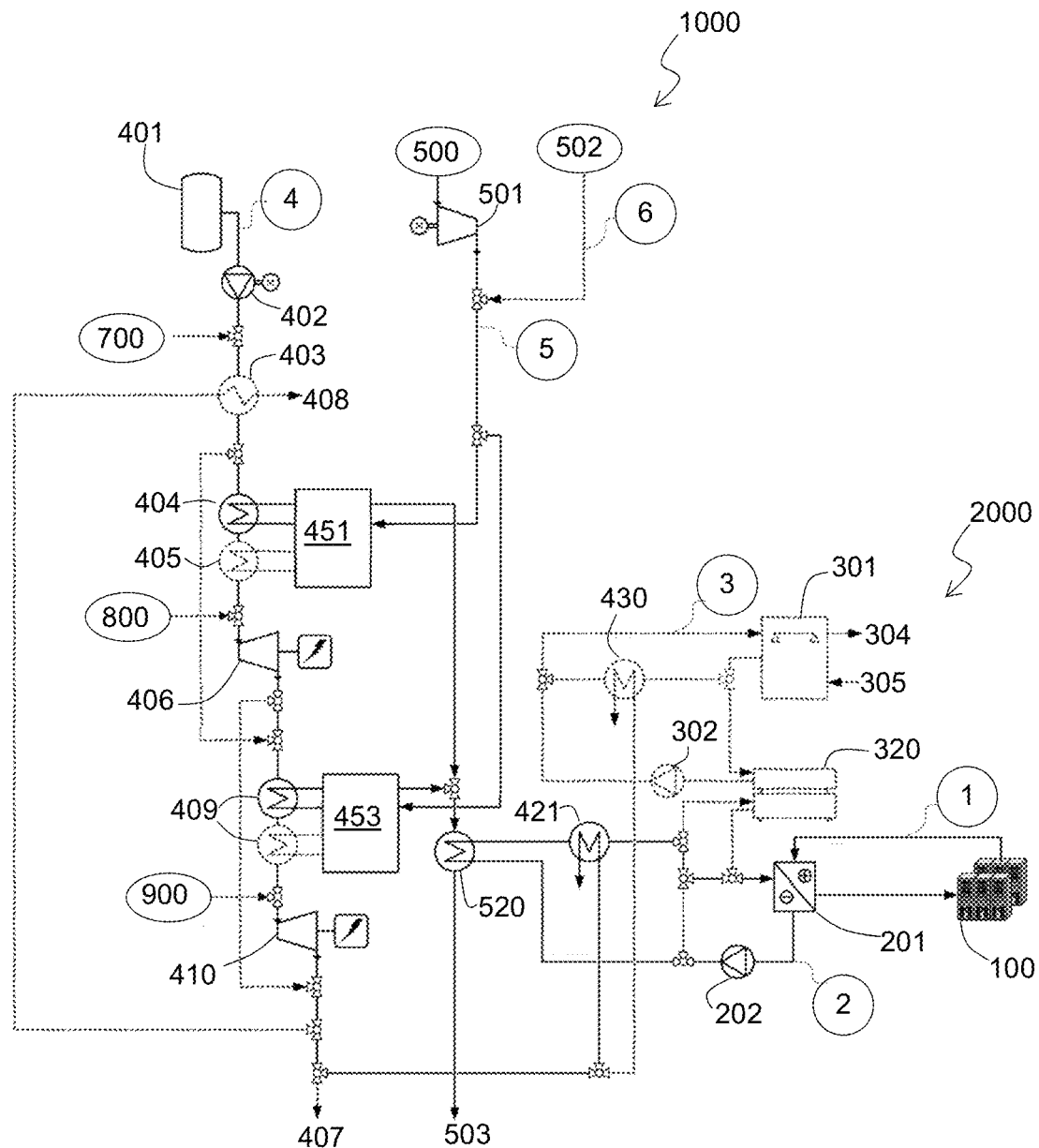
FIG. 10 is the system of FIG. 5 configured as a standalone cryogenic energy system operated under thermal-load-following control strategy when the heat supply open loop is active.

FIG. 10 depicts the exemplary dual stage system 1000 of FIG. 5 configured as a standalone cryogenic energy system 1000 operated under thermal-load-following control strategy when the heat supply open loop 5 is active. Thermal-load-following is a convenient control strategy to reduce the cryogen consumption and operational costs when backup power is not a requirement. It is also adapted to generate decentralized power or backup power for particular end-users 100 where the electricity requirement is much lower than the cold energy requirement. If the heat supply open loop 5 is the only driver for power generation, this loop 5 remains also active under thermal-load following-control strategy. Both of the transfer-expansion stages 404, 405, 406, 409, 410 are functioning to assure nominal operation. Therefore, the bypasses of both stages 404, 405, 406, 409, 410 are inactive. The cryogen 401 is consecutively pressurized in the motor-pump 402, gasified in the evaporator 404 and the optional superheater 405, expanded in the turbine HP 406, reheated in the reheater(s) 409, expanded again in the turbine LP 410, reheated in the first cold recuperator 421 and then exhausted. The generators coupled to the turbines 406, 410 deliver power outputs that cover a part-load of the electricity requirement of the indoor environment 100. Since the recovery and use of the cold energy from the exit of stage LP 409, 410 is particularly suitable under thermal-load-following control strategy, the first cold recuperator 421 is activated to reduce the cryogen consumption and operational costs. In the cooling system first heat transfer loop 2, all the required cold energy for the cooling load is received from both the heat supply open loop 5 via the cooler 520 and the exit of stage LP 409, 410 of the cryogenic loop 4 via the first cold recuperator 421; the chiller and its related heat rejection process (i.e. cooling system second heat transfer loop 3) are inactive.

FIG. 11 depicts the exemplary dual stage system 1000 of FIG. 6 configured as a standalone cryogenic energy system 1000 operated under thermal-load-following control strategy when the heat supply open loop 5 is inactive and stage HP 404, 406 is used. Thermal-load-following is a convenient control strategy to reduce the cryogen consumption and operational costs when backup power is not a requirement. It is also adapted to generate decentralized power or backup power for particular end-users 100 where the electricity requirement is much lower than the cold energy requirement. If the heat supply open loop 5 is not the only driver for power generation, this loop 5 is inactive under thermal load following control strategy. Stage HP 404, 406 is involved and the bypass of stage LP 409, 410 is activated to skip the reheater 409 and turbine LP 410. The cryogen 401 is consecutively pressurized in the motor-pump 402, gasified in the evaporator 403, expanded in the turbine HP 406, reheated in the first cold recuperator 421 and then exhausted. The generator coupled to turbine HP 406 delivers power output that covers a part-load of the electricity requirement. Since the recovery and use of the cold energy from the exit of stage HP 404, 406 is particularly suitable under thermal-load-following control strategy, the first cold recuperator 421 is activated to reduce the cryogen consumption and operational costs. In the cooling unit firs heat transfer loop 2, all the required cold energy for the cooling load is received from both the gasification process at the evaporator 404 and from the exit of stage HP 404, 406 via the first cold recuperator 421; the chiller 320 and its related heat rejection process (i.e. cooling system second heat transfer loop 3) are inactive.

FIG. 12 depicts the exemplary dual stage system 1000 of FIG. 6 configured as a standalone cryogenic energy system 1000 operated under thermal-load-following control strategy when the heat supply open loop 5 is inactive and stage LP 409, 410 is used. Thermal-load-following is a convenient control strategy to reduce the cryogen consumption and operational costs when backup power is not a requirement. It is also adapted to generate decentralized power or backup power for particular end-users 100 where the electricity requirement is much lower than the cold energy requirement. If the heat supply open loop 5 is not the only driver for power generation, this loop 5 is inactive under thermal-load-following control strategy. Stage LP 409, 410 is involved and the bypass of stage HP 405, 406 is activated to skip the superheater 405 and turbine HP 406. The cryogen is consecutively pressurized in the motor-pump 402, gasified in the evaporator 403, expanded in the turbine LP 410, reheated in first cold recuperator 421 and then exhausted. The generator coupled to turbine LP 410 delivers power output that covers a part-load of the electricity requirement. Since the recovery and use of the cold energy from the exit of stage LP 409, 410 is particularly suitable under thermal-load-following control strategy, the cold recuperator 421 is activated to reduce the cryogen consumption and operational costs. In the cooling unit heat first transfer loop 2, all the required cold energy for the cooling load is received from both the gasification process at the evaporator 404 and the exit of stage LP 409, 410 via the first cold recuperator 421; the chiller 320 and its related heat rejection process (i.e. cooling system second heat transfer loop 3) are inactive.

FIG. 13 depicts the exemplary single stage system 1000 of FIG. 2 configured as a hybrid cryogenic energy system 1000 where the chiller 320 of the conventional cooling system 2000 is bypassed. The hybrid cryo-cogenerator 1000 is a multi-energy vector. Under hybrid operation, the cryo-cogenerator 1000 is coupled with an external fuel-based power generation process or other process 502 that supplies hot fluid to the system 1000 via the heat supply open loop 5. The ambient air intake 500 is inactive and the involved hot fluid from the external process 502 passes from the active line 6 to the heat supply open loop 5 to provide heat flux at high temperature to the cryogenic open loop 4. The cryogen 401 is consecutively pressurized in the motor-pump 402, gasified in the evaporator 404 and the optional superheater 405, expanded in the turbine 406, reheated in the first cold recuperator 421 and then exhausted. The generator coupled to the turbine 406 delivers power output that covers a part-load of the electricity requirement of the indoor environment 100. The high-temperature heat supply from the external process 502 is able to increase the turbine inlet temperature, which results in a high performance of the hybrid cryo-cogenerator 1000. Cold energy recuperation is applicable if the turbine inlet temperature and accordingly the turbine outlet temperature do not get too high. At a relatively low turbine outlet temperature, the first cold recuperator 421 is activated to exploit the cold energy still available at the exit of the turbine 406. In the cooling system first heat transfer loop 3, all the required cold energy for the cooling load is received from both the heat supply open loop 5 via the cooler 520 and the exit of the turbine 406 via the first cold recuperator 421; the chiller and its related heat rejection process (i.e. cooling system second heat transfer loop 3) are inactive.

Figure 4:
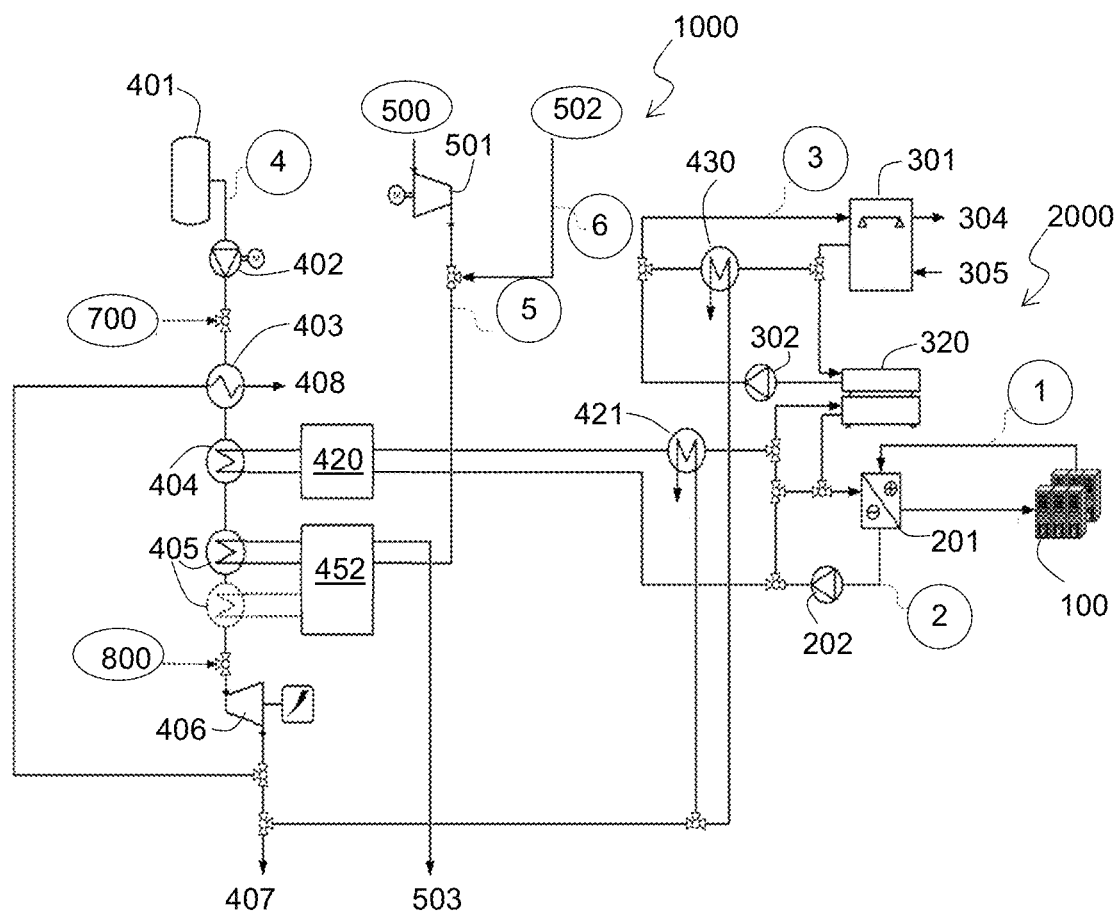
FIG. 4 is a schematic layout of an exemplary single stage cryogenic energy system where removed heat from an indoor environment may additionally or alternatively drive power generation.

FIG. 14 depicts the exemplary single stage system 1000 of FIG. 4 configured as a hybrid cryogenic energy system 1000 that uses both the chiller 320 of the conventional cooling system 2000 and cold energy recuperation from the cryogenic loop 4 for cooling the indoor environment 100. The hybrid cryo-cogenerator 1000 is a multi-energy vector. Under hybrid operation, the cryo-cogenerator 1000 is coupled with an external fuel-based power generation process or other process 502 that supplies hot fluid to the system 1000 via the heat supply open loop 5. The ambient air intake 500 is inactive and the involved hot fluid from the external process 502 passes from the active line 6 to the heat supply open loop 5 to provide heat flux at high temperature to the cryogenic open loop 4. The cryogen 401 is consecutively pressurized in the motor-pump 402, gasified in the evaporator 404 and the superheater(s) 405, expanded in the turbine 406, reheated in the first cold recuperator 421 and then exhausted. The generator coupled to the turbine 406 delivers power output that covers a part-load of the electricity requirement of the indoor environment 100. The high-temperature heat supply from the external process 502 is able to increase the turbine inlet temperature, which results in a high performance of the hybrid cryo-cogenerator 1000. Cold energy recuperation is applicable if the turbine inlet temperature and accordingly the turbine outlet temperature do not get too high. At a relatively low turbine outlet temperature, the first cold recuperator 421 is activated to exploit the cold energy still available at the exit of the turbine 406. In the cooling system heat transfer loop 2, the required cold energy for the cooling load is received from the gasification process at the evaporator 404, from the exit of the turbine 406 via the first cold recuperator 421 and the chiller 320 of the conventional cooling system 2000. As the chiller 320 is used, the heat rejection process (i.e. cooling system second heat transfer loop 3) is active.

FIG. 15 depicts the exemplary single stage system 1000 of FIG. 4 configured as a hybrid cryogenic energy system 1000 that uses both the chiller 320 of the conventional cooling system 2000 and cold energy recuperation from the cryogenic loop 4 for the heat rejection process (i.e. cooling system second heat transfer loop 3). The hybrid cryo-cogenerator 1000 is a multi-energy vector. Under hybrid operation, the cryo-cogenerator 1000 is coupled with an external fuel-based power generation process or other process 502 that supplies hot fluid to the system 1000 via the heat supply open loop 5. The ambient air intake 500 is inactive and the involved hot fluid from the external process 502 passes from the active line 6 to the heat supply open loop 5 to provide heat flux at high temperature to the cryogenic open loop 4. The cryogen 401 is consecutively pressurized in the motor-pump 402, gasified in the evaporator 404 and the superheater(s) 405, expanded in the turbine 406, reheated in the second cold recuperator 430 and then exhausted. The generator coupled to the turbine 406 delivers power output that covers a part-load of the electricity requirement of the indoor environment 100. The high-temperature heat supply from the external process 502 is able to increase the turbine inlet temperature, which results in a high performance of the hybrid cryo-cogenerator 1000. Cold energy recuperation is applicable if the turbine inlet temperature and accordingly the turbine outlet temperature do not get too high. At a relatively low turbine outlet temperature, the second cold recuperator 430 is activated to exploit the cold energy still available at the exit of the turbine 406. In the cooling system heat transfer loop 2, the required cold energy for the cooling load is received from the gasification process at the evaporator 404 and the chiller 320 of the conventional cooling system 2000. As the chiller 320 is used, the heat rejection process (i.e. cooling system second heat transfer loop 3) is active. In the cooling system second heat transfer loop 3, the cold energy recovered from the second cold recuperator 430 is used together with the cooling tower 301 for the heat rejection process.

To sum up, the cryogenic energy system 1000 provides combined generation of cooling and power to i) data centre and/or ii) other end-users/indoor environments 100 according to various/flexible control modes. The cryogenic energy system 1000 can operate as a backup power generator (cryo-genset) or during on-grid conditions under either an electrical-load-following control strategy or a thermal-load-following control strategy or other strategies. The cryogenic energy system 1000 can operate in either a standalone mode or in a hybrid mode with a fuel-based process (e.g. combustion engine process, fuel cell) or other process (e.g. solar, geothermal, etc.) 502 coupled 6 via the heat supply open loop 5.

The heat supply open loop 5 is implemented as a part of the cryogenic energy system 1000. It can use the outside ambient air 500 as a free and available hot fluid source, is especially suitable for electrical-load-following control strategy, thus enabling use of the cryo-system 1000 in a standalone configuration as a backup power generator. It can also involve other sources 500, 502 of hot fluid instead of ambient air: i) glycol-water mixture or other fluid 500; ii) flue gases 502 in the case of hybrid operation with a combustion engine process; iii) exhaust gases and vapour/stack coolant outlet/surplus fuel return 502 in the case of hybrid operation with a fuel cell process.

The heat supply open loop 5 can be used as the only driver of the gasification and power generation processes in the cryogenic open loop 4, under the different control strategies. In this case, the heat supply open loop 5 serves as an intermediate heat transfer open loop between the cryogenic open loop 4 and the conventional cooling system 2000: it is directly or indirectly connected to the cryogenic open loop 4 through the heat exchanger(s) of the transfer-expansion stage(s) (evaporator 404 and optional superheater 405 in case of single stage system/evaporator, optional superheater 405 and reheater(s) 409 in case of multistage system) and connected to the conventional cooling system 2000 through one heat exchanger (cooler 520).

In case of an important thermal load (e.g. waste heat from server racks in a data centre 100), the removed heat can be used together with the outside ambient air 500 as dual hot sources for the cryo-cogenerator 1000. It can be subject to direct or indirect heat transfer to the cryogenic open loop 4. In particular, if backup power is not a requirement, the heat supply open loop 5 is inactive when the standalone cryo-cogenerator 1000 operates under thermal-load-following control strategy.

The cryogenic open loop 4 can have a multistage layout (2 stages or more) as shown in FIGS. 5-12 that offers various/flexible configurations, i.e., all the transfer-expansion stages can operate in series (nominal operation) while assuring the redundancy of each other (as each stage can also operate independently).

The cryogenic energy system 1000 can include an optional topping closed cycle as shown in FIGS. 3(c), 3(d) and 3(e) using another cryogen for power generation, making the system 1000 a parallel or serial-parallel cryogenic cascade (e.g. nitrogen-based bottoming open cycle+argon-based topping closed cycle; hydrogen-based bottoming open cycle+nitrogen-based topping closed cycle; hydrogen-based bottoming open cycle+argon-based topping closed cycle; nitrogen-based bottoming open cycle+hydrocarbon-based topping closed cycle; hydrogen-based bottoming open cycle+hydrocarbon-based topping closed cycle).

Optional additive fluid (at desired conditions) 800, 900 can be injected to the cryogenic open loop and mix with the cryogen at the entrance of the turbine(s) 406, 410. The use of this additive (e.g. helium, hydrogen or any other suitable additive) 800, 900 is able to increase the enthalpy drop within the turbine(s) 406, 410 and thus reduce the cryogen 401 consumption. This option can be used as a trade-off between the total storage volume for cryogen 410 (land space) and the operational cost.

In implementations of the cryogenic energy system 1000 when the heat supply open loop 5 is the only driver used for power generation (e.g. as shown in FIGS. 2, 5, 8, 10 and 13), the cooler 520 (heat exchanger connected to the heat supply open loop 5) and one optional cold recuperator 421 (heat exchanger connected to the exit of the last turbine 406 or 410 in the cryogenic open loop 4) are in series in the conventional heat transfer loop 2 in connection with the cooling unit(s) 201 (e.g. water loop) i) to by-pass the main cooling facility 320 (e.g. the chiller(s)) or ii) to share the cooling load with the main cooling facility 300 (i.e. the two heat exchangers 520, 421 and the main cooling facility 302 are in series).

In implementations of the cryogenic energy system 1000 when the heat supply open loop 5 is not the only driver used for power generation (e.g. as shown in FIGS. 4, 7, 9, 11, 12, 14 and 15), in the conventional heat transfer loop 2 in connection with the cooling unit(s) 302, one optional cold recuperator 421 (comprising a heat exchanger connected to the exit of the last turbine 406 or 410 in the cryogenic open loop 4) is either in series directly with the evaporator 404 (heat exchanger part of the cryogenic open loop 4) or in series with an intermediate heat exchanger 40 of the intermediate heat transfer loop 40 or a topping cycle heat exchanger 50 of the topping closed cycle (e.g. as shown in FIGS. 3(b) to 3(e)). These two heat exchangers 421, 420 in a serial arrangement can either i) by-pass the main cooling facility 320 (e.g. the chiller(s)) or ii) share the cooling load with the main cooling facility 320 (i.e. the two heat exchangers 420, 421 and the main cooling facility 320 are in series).

In some embodiments (additional functionality), the cryogenic energy system 1000 may comprise one second optional cold recuperator 430 (heat exchanger connected to the exit of the last turbine 406 or 410 in the cryogenic open loop 4) that can fully or partially support the heat rejection process when the chiller(s) 320 is operating together with cryo-cogenerator 1000 (i.e. the cold recuperator 430 can either by-pass or share the load with the cooling tower(s) 301).

The flux exhausting 407 from the last cryogenic turbine 406 or 410 can be exploited according to different modes, either as a hot flux that serves to preheat and gasify the cryogen 401 within the cryogenic loop 4 at the preheater 403 or as a cold flux that serves to support a cooling part-load at one or more cold recuperators 421, 430.

When the cryo-cogenerator 1000 operates in standalone mode, the preheating process (i.e. recovery of heat from the exit of the last cryogenic turbine 406 or 410 to preheat the cryogen 401 via a preheater 403 located in the cryogenic loop 4) is particularly suitable under electrical-load-following control strategy to reduce the cryogen 401 consumption and operational costs (e.g. when backup power is needed).

When the cryo-cogenerator 1000 operates in standalone mode, cold energy recuperation (i.e. recovery and use of the cold energy from the exit of the last cryogenic turbine 406 or 410 (or from the preheater 403) via a cold recuperator 421 located in the cooling unit(s) heat transfer loop 2) is particularly suitable under thermal-load-following control strategy to reduce the cryogen 401 consumption and operational costs (e.g. when backup power is not a requirement). Under hybrid operation, cold energy recuperation can be suitable under the different control strategies even when backup power is required Under hybrid operation mode, the cryo-cogenerator 1000 is coupled 6 with a fuel-based power generation process (e.g. internal combustion engine, fuel cell) or other process 502 via the heat supply open loop 5. The air intake 500 is inactive and the involved hot fluid 502 (e.g. exhaust gases and vapour, fuel, refrigerant) passes through the heat supply open loop 5 to provide heat flux at high temperature to the cryogenic open loop 4, thus increasing the turbine inlet temperature in each expansion stage. This enables reduction of the specific consumption of cryogen 401 compared to the standalone cryo-system 1000. For certain involved hot fluids 502 such as stack coolant or surplus fuel from a fuel cell process, the fluid 503 is not discharged at the exit of the heat supply open loop 5 but is subject to recirculation (not shown).

Under hybrid operation mode, the cryo-cogenerator 1000 is multi-functional and multi-controllable. It can be used as a backup power generator when the cryo-system 1000 operates under thermal-load-following control strategy or other particular control strategies. For high source temperatures, the operating conditions and accordingly the turbine(s) 406, 410 inlet temperature(s) can be varied according to the needs (e.g. operational cost, emission level limit, etc.). From certain high turbine inlet temperatures, the cold energy recuperation at the exit of the last cryogenic turbine 406 or 410 is no longer applicable and the resulting regime of the cryo-system 1000 can no more fully support the required thermal load. In this case, the conventional chiller(s) 320 is/are supplied by the hybrid cryo-cogenerator 1000 to add cold energy.

Advantages of the cryogenic energy system 1000 include the following:
  Green energy vector (no local emissions) compared to diesel gensets
  Decentralized
  High grade cold energy level
  High energy density
  High power density
  Combined generation of cooling and power
  No locality constraints compared to the LNG-based methods and solutions for polygeneration
  Compactness
  Main components (cryo-turbine 406, 410, cryo-pump 402, compact finned-tube heat exchangers 404, 405, 409) are mature technologies already used in the gas production plants Reliability, scalability and long life cycle Adaptability to different control strategies for different requirements (multi-functional/multi-control)

Possible trade-off between operational cost and emissions via hybrid operation with a combustion engine process Recuperative: i) possible recovery and use of the removed heat (e.g. waste heat from server racks in a data centre 100); ii) possible recovery of internal heat from the exit of the cryogenic turbine 406 or 410 for preheating use; iii) possible recovery and use of the cold energy from the exit of the cryogenic turbine 406 or 410 or from the preheater 403; iv) possible recovery and use of heat from exhaust gases 503 or other medium in the case of a hybrid operation with a fuel-based power generation process 502 (e.g. internal combustion engine, fuel cell or other process)

High system performance

Low capital expenditure (CAPEX)

Easy retrofitting in the existing sites (i.e. minor modifications of the conventional cooling system 2000)

Self-redundancy offered by the multi-stage layout for the case of a standalone cryo-system 1000

Self-redundancy offered by the multi-energy vector for the case of an hybrid cryo-system 1000

The implementation of the cryogenic system can also replace/reduce the redundant mechanical components of the conventional cooling system 2000 (redundant chiller(s) 320 and cooling tower(s) 301)

No after-use extra treatment compared to batteries

Can result in lower PUE values compared to the conventional cooling systems 2000 for the case of data centres 100

Additional advantages may include:

possibility of exploiting the by-products of air separation plants depending on the local market context (e.g. price of liquid nitrogen)

possible synergies with renewable energy sources (e.g. solar, geothermal, etc.) and other processes (e.g. waste heat recovery)

possible derivation for thermal energy storage (TES) system

Possible extension to liquid air energy storage (LAES) system

Possible use of the cryogen (e.g. liquid nitrogen or any other inert cryogen) also as a fire extinguishing agent for an onsite fire suppression system The cryogenic energy system 1000 described in the various embodiments above is a novel zero-emission polygeneration alternative that can be proposed to various electricity and cold energy consumers. It can serve as a cryo-genset (backup power generator) in replacement of the traditional polluting and noisy diesel genset. Besides, the use of the cryo-system 1000 during particular on-grid conditions (e.g. grid peak demand, high electricity price) could be considered as an energy saving strategy for certain consumers, such as data centres located in hot and humid climates (e.g. tropical climates) or in air-polluted regions where airside free cooling is not favourable. Besides data centres, the cryogenic energy system 1000 could be applicable in building cooling, refrigerated warehouses and any other cooling process where the use of chillers, air coolers or equivalent facilities are required.

The cryogenic energy system 1000 draws heavily on established components from the power generation and industrial gas sectors. This provides a shorter system validation and lower technology risk than most new technologies being introduced in the clean tech and data centre space. The integration and retrofitting of the cryogenic energy system with existing conventional cooling systems can thus be performed on a very large scale.

Whilst there has been described in the foregoing description examples of embodiments of the present invention, it will be understood by those skilled in the technology concerned that many variations and combination in details of design, construction and/or operation may be made without departing from the present invention.

REFERENCES

[1] T. Evans, The Different Technologies for Cooling Data Centers, 2012.
[2] National Enviroment Agency (NEA), data centre Energy Efficiency Benchmarking, 2012.
[3] M. Klochko, U. Kaplan, D. Batscha, N. Amir, D. Machlev, L. Y. Bronicki, LNG-BASED POWER AND REGASIFICATION SYSTEM, U.S. Pat. No. 7,493,763 B2, 2009. doi:10.1016/j.(73).
[4] R. SHATTEN, J. D. Jackson, J. G. Brisson, System and methods for data center cooling and power generation using liquefied natural gas, WO2013130557A1, 2013.
[5] P. T. Dearman, ENGINES DRIVEN BY LIQUIFIED OR COMPRESSED GAS (75), U.S. Pat. No. 6,983,598 B2, 2006. doi:10.1016/j.(73).
[6] M. Ayres, H. Clarke, M. Dearman, A cryogenic engine driven refrigeration system, GB2508017A, 2014.

The invention claimed is:

1. A cryogenic energy system for cooling and powering an indoor environment, the system comprising:
a cryogenic open loop comprising a cryogen source to supply a cryogen and at least one transfer-expansion stage in fluid connection with the cryogen source, each transfer-expansion stage comprising at least one heat exchanger for heat transfer therein from a hot fluid to the cryogen and a power unit for expansion therein of the cryogen that has been heated in the at least one heat exchanger to generate electricity, the at least one heat exchanger including an evaporator; and
a heat supply open loop configured to provide the hot fluid for heat exchange with the cryogen in the at least one heat exchanger, the heat supply open loop comprising an exit for the hot fluid that has been cooled by the cryogen in the at least one heat exchanger;
the cryogenic energy system configured to perform heat removal from a first heat transfer loop of a conventional cooling system of the indoor environment for at least partially cooling the indoor environment, the first heat transfer loop transferring heat obtained from air in the indoor environment, wherein the heat removal comprises one of:
heat transfer from the first heat transfer loop to the cryogen in the evaporator, and;
heat transfer from the first heat transfer loop to the hot fluid in the heat supply open loop that has been cooled by the cryogen in the evaporator.

2. The cryogenic energy system of claim 1, wherein the heat supply open loop comprises a hot fluid source to supply the hot fluid and a fluid connection with an external source providing an alternative supply of the hot fluid.

3. The cryogenic energy system of claim 1, wherein the at least one heat exchanger further includes at least one superheater for heat transfer from the hot fluid in the heat supply open loop to the cryogen.

4. The cryogenic energy system of claim 1, further comprising a cooler for effecting heat transfer from the first heat transfer loop to the hot fluid in the heat supply open loop that has undergone heat transfer to the cryogen in the evaporator.

5. The cryogenic energy system of claim 1, further comprising a first cold recuperator for effecting heat transfer from the first heat transfer loop to the cryogen that has been expanded in a last of the at least one transfer-expansion stage.

6. The cryogenic energy system of claim 1, further comprising a second cold recuperator for effecting heat transfer from second heat transfer loop of the conventional cooling system to the cryogen that has been expanded in a last of the at least one transfer-expansion stage, the second heat transfer loop transferring heat from a chiller of the conventional cooling system to a cooling tower.

7. The cryogenic energy system of claim 1, wherein the at least one transfer-expansion stage comprises a plurality of transfer-expansion stages, and wherein the plurality of transfer-expansion stages comprises at least a first transfer-expansion stage and a second transfer-expansion stage.

8. The cryogenic energy system of claim 7, wherein the at least one heat exchanger of the first transfer-expansion stage comprises the evaporator and a superheater.

9. The cryogenic energy system of claim 7, wherein the at least one heat exchanger of the second transfer-expansion stage comprises at least one reheater.

10. The cryogenic energy system of claim 7, wherein the plurality of transfer-expansion stages are configured to be operated in series; and wherein each of the plurality of transfer-expansion stages is provided with a bypass configured to allow each of the plurality of transfer-expansion stages to be selectably bypassed in case it is not serviceable, thereby providing redundancy to the cryogenic energy system.

11. The cryogenic energy system of claim 1, further comprising a preheater for effecting heat transfer from cryogen that has been expanded in a last of the at least one transfer-expansion stage to the cryogen at one of: immediately upstream of the evaporator and immediately downstream of the evaporator.

12. The cryogenic energy system of claim 1, further comprising an indirect connection for transferring heat from the hot fluid to the cryogen in the at least one heat exchanger of the at least one transfer-expansion stage.

13. The cryogenic energy system of claim 12, wherein the indirect connection includes at least one intermediate heat transfer loop comprising a suitable fluid in a closed loop with an intermediate heat exchanger and an expansion valve, wherein the suitable fluid is passed through the intermediate heat exchanger for heat transfer from the hot fluid to the suitable fluid, wherein the suitable fluid after heat transfer from the hot fluid is expanded through the expansion valve, and wherein heat is transferred from the expanded suitable fluid to the cryogen in the at least one heat exchanger of the at least one transfer-expansion stage.

14. The cryogenic energy system of claim 12, wherein the indirect connection includes a topping cycle, the topping cycle comprising a further cryogen in a closed loop with a topping cycle heat exchanger and a topping cycle power unit, wherein the further cryogen is passed through the topping cycle heat exchanger of the intermediate heat transfer loop for heat transfer from the hot fluid to the further cryogen, wherein the further cryogen after heat transfer from the hot fluid is expanded through the topping cycle power unit, and wherein heat is transferred from the expanded further cryogen to the cryogen in the at least one heat exchanger of the at least one transfer-expansion stage.

15. The cryogenic energy system of claim 13, wherein the indirect connection comprises one intermediate heat transfer loop and one topping cycle, wherein the suitable fluid is heated in the intermediate heat exchanger by the expanded further cryogen instead of the hot fluid.

16. The cryogenic energy system of claim 13, wherein the indirect connection comprises one intermediate heat transfer loop and one topping cycle, wherein the further cryogen is heated in the topping cycle heat exchanger by the expanded suitable fluid instead of the hot fluid.

17. The cryogenic energy system of claim 1, wherein the further cryogen comprises at least one of: argon, nitrogen, and a hydrocarbon.

18. The cryogenic energy system of claim 1, further comprising an injection of an additive fluid to the cryogen in the cryogenic loop between heating of the cryogen in the at least one heat exchanger and expansion of the cryogen in the power unit.

19. The cryogenic energy system of claim 1, wherein the hot fluid source comprises one of: ambient air, water, and a mixture of water and glycol.

20. The cryogenic energy system of claim 1, wherein the external source providing the alternative supply of the hot fluid comprises a fuel-based power generation process.

21. The cryogenic energy system of claim 1, wherein the cryogenic energy system is controlled by an electrical-load-following control strategy wherein satisfying electrical energy requirements of the indoor environment is prioritised.

22. The cryogenic energy system of claim 1, wherein the cryogenic energy system is controlled by a thermal-load-following control strategy wherein satisfying cooling requirements of the indoor environment is prioritised.

23. The cryogenic energy system of claim 1, wherein the heat supply open loop is inactive and wherein the heat removal comprises heat transfer from the first heat transfer loop to the cryogen in the evaporator.

24. The cryogenic energy system of claim 1, wherein the cryogen comprises at least one of: liquid air, liquid nitrogen, and liquid hydrogen.

25. The cryogenic energy system of claim 1, wherein the exit of the heat supply open loop is configured for:
recirculating and/or recycling the hot fluid that has been cooled by the cryogen; and/or
transferring the hot fluid that has been cooled by the cryogen to surroundings and/or other locations for cooling purposes.

* * * * *